(12) United States Patent
Yastrum et al.

(10) Patent No.: US 12,436,825 B2
(45) Date of Patent: Oct. 7, 2025

(54) DATA ANALYTICS FOR DIGITAL CATALOGS

(71) Applicant: PRODX, LLC, Tacoma, WA (US)

(72) Inventors: Brodrick David Yastrum, Huntington Beach, CA (US); Robert Lawrence Bertsch, Tacoma, WA (US); Meaghan Carroll Jones, Huntington Beach, CA (US); Matthew James Vezzani, Gig Harbor, WA (US)

(73) Assignee: PRODX, LLC, Tacoma, WA (US)

( * ) Notice: Subject to any disclaimer, the term of this patent is extended or adjusted under 35 U.S.C. 154(b) by 0 days.

(21) Appl. No.: 19/088,740

(22) Filed: Mar. 24, 2025

(65) Prior Publication Data

US 2025/0225003 A1 Jul. 10, 2025

Related U.S. Application Data

(63) Continuation of application No. 18/925,777, filed on Oct. 24, 2024, which is a continuation of application No. 18/432,857, filed on Feb. 5, 2024, which is a continuation of application No. 18/367,391, filed on Sep. 12, 2023, now Pat. No. 11,928,526.

(51) Int. Cl.
  *G06F 9/54* (2006.01)
  *G06Q 30/0601* (2023.01)
(52) U.S. Cl.
  CPC .......... *G06F 9/542* (2013.01); *G06Q 30/0603* (2013.01)

(58) Field of Classification Search
  CPC ..................................................... G06F 9/541
  See application file for complete search history.

(56) References Cited

U.S. PATENT DOCUMENTS

| | | | |
|---|---|---|---|
| 8,326,690 B2 * | 12/2012 | Dicker | G06Q 30/0631 705/26.7 |
| 10,417,687 B1 * | 9/2019 | Reel | G06Q 30/0603 |
| 10,885,010 B2 | 1/2021 | Hills et al. | |
| 10,901,959 B2 | 1/2021 | Pea et al. | |
| 11,222,048 B2 | 1/2022 | Ferrentino et al. | |
| 11,424,020 B2 | 8/2022 | Wisser et al. | |
| 11,538,076 B1 | 12/2022 | McCormick | |
| 11,960,528 B1 * | 4/2024 | Deorha | G06F 16/532 |
| 12,106,358 B1 | 10/2024 | Bockius et al. | |
| 2023/0071799 A1 | 3/2023 | Ramnani et al. | |

* cited by examiner

*Primary Examiner* — Andy Ho
(74) *Attorney, Agent, or Firm* — Workman Nydegger

(57) ABSTRACT

Techniques for standardizing a catalog of data and for using the standardized data to implement various APIs are disclosed. Non-standardized data is received. This data includes information describing items, customer information, and unstructured review data. The non-standardized data is converted to a standardized format, resulting in the generation of standardized data. The standardized data includes a hierarchy of defined categories. Each category is associated with a set of attribute types. The standardized data also includes anonymized profiles. The unstructured review data is also provided structure. A data model is generated based on the standardized data. Various APIs can then use the data model to perform operations.

20 Claims, 26 Drawing Sheets

Architecture
100

Frozen Pizza

| Row | Attribute | Type | ID |
|---|---|---|---|
| 1 | Brand | Text | 1 |
| 2 | Rising Crust | Boolean | 47 |
| 3 | Organic | Boolean | 137 |
| 4 | Gluten Free | Boolean | 152 |
| 5 | Vegan | Boolean | 151 |
| 6 | Sodium | Text | 39 |
| 7 | Preparation | Text | 130 |
| 8 | Spice Level | Text | 60 |
| 9 | Flavor Brand | Text | 52 |
| 10 | Flavor | Text | 6 |
| 11 | Grain Type | Text | 41 |
| 12 | Crust | Text | 53 |
| 13 | Artisan | Boolean | 279 |
| 14 | Vegetarian | Boolean | 154 |
| 15 | Flour Type | Text | 452 |
| 16 | Carbs | Text | 868 |
| 17 | Peanut Free | Boolean | 644 |
| ... | | | |

| Synonyms 325 |
|---|
| Relationships 330 |
| Ranking 335 |

*Figure 3*

Non-Standardized Data 500

| | UPC | Name | Amount | Price |
|---|---|---|---|---|
| 1 | 086099700260X | Alex's Awesome Sourdough Pizza | 12 oz Box | 10.16 |
| 2 | 086099700260S | Alex's Awesome Sourdough Cheese Artisan Pizza | 12.0 ounce | 6.41 |
| 3 | 065216001355X | Amnons Kosher Pizza | 36 oz Bag | 18.99 |
| 4 | 065216001355 | Amnon's Kosher Piz. | 17.5 oz | $17.91 |
| 5 | 004227200128X | Amy's 4 Cheese Pizza | 12 oz Bag | 11.99 |
| 6 | 004227200128 | Amy's Four Cheese Pizza | 12 OZ | 6.99 |
| 7 | 000427200128G | Amy's Organic Four Cheese Pizza | 12 oz | 7.7 |
| 8 | 000427200128G | Amys Pizza, 4 Cheese | 12 oz | 7.99 |

Standardized Data 600

| UPC | Name | Amount | Price | Attribute A | Attribute B | Attribute C |
|---|---|---|---|---|---|---|
| 1. 086099700260X | Alex's Awesome Sourdough Pizza | 12 oz Box | 10.16 | aaaa | bbbb | cccc |
| 2. 086099700260S | Alex's Awesome Sourdough Cheese Artisan Pizza | 12 oz Box | 6.41 | aaaa | bbbb | cccc |

Attribute 605
Attribute 610
Attribute 615
620 ...

*Figure 6*

Aisle Plan Groups
1300

| Name | Plan | Context | Priority |
|---|---|---|---|
| Search – Default | 3 | 0 | 5 |
| Search – High Volume Items | 1 | 1 | 3 |
| Search – Gluten Free | 1 | 1 | 2 |
| Search – Vegetarian | 1 | 1 | 1 |
| Search - Vegan | 1 | 1 | 4 |

Analytics
1305

*Figure 13*

Aisle Plans
1400

| Name | Weight |
|---|---|
| Default | 90 |
| Past Purchase Focus | 10 |
| Private Label Focused | 0 |

*Figure 14*

| Campaign Name | ROAs | Acquire | Defend | Steal | Recapture |
|---|---|---|---|---|---|
| Campaign #14 – Search | $8.49 | 697 | 1362 | 289 | 151 |
| Campaign #13 - Search | $9.84 | 506 | 1182 | 142 | 76 |
| Campaign #12 - Search | $6.93 | 456 | 338 | 183 | 33 |
| Campaign #11 - Categories | $9.99 | 85 | 82 | 150 | 17 |
| Campaign #10 - Search | $9.96 | 365 | 165 | 56 | 21 |
| Campaign #9 - Substitutes | $9.85 | | 74 | | 5 |
| Campaign #8 - Purchases | $9.99 | 328 | 411 | | 18 |
| Campaign #7 - Search | $6.85 | 11 | 44 | 2 | 8 |
| Campaign #6 - Complements | $8.11 | | 83 | | 10 |
| Campaign #5 - Purchases | $9.98 | 2 | 15 | 3 | 2 |
| Campaign #4 - Categories | $9.80 | 11 | | 12 | 5 |
| Campaign #3 - Categories | $6.06 | 11 | 29 | 11 | 3 |

Bid Modifiers UI
2200

| Brand | Type | Multiplier | Normal Bid | Modified Bid | Minimum Modified |
|---|---|---|---|---|---|
| Grocer A | Position: 1 | 2 | 15% | 30% | 9% |
| Grocer A | Acquire | 3 | 15% | 45% | 20% |
| Grocer A | Defend | 2 | 15% | 30% | 20% |
| Grocer A | Steal | 5 | 15% | 75% | 20% |
| Grocer A | Recapture | 4 | 15% | 60% | 20% |

*Figure 22*

DATA ANALYTICS FOR DIGITAL CATALOGS

CROSS-REFERENCE TO RELATED APPLICATIONS

This application is a continuation of U.S. patent application Ser. No. 18/925,777 filed Oct. 24, 2024, entitled "DATA ANALYTICS FOR DIGITAL CATALOGS," which is a continuation of U.S. patent application Ser. No. 18/432,857 filed on Feb. 5, 2024, entitled "DATA ANALYTICS FOR DIGITAL CATALOGS," which is a continuation of U.S. patent application Ser. No. 18/367,391 filed on Sep. 12, 2023, entitled "DATA ANALYTICS FOR DIGITAL CATALOGS," which issued as U.S. Pat. No. 11,928,526 on Mar. 12, 2024, which applications are expressly incorporated herein by reference in their entirety.

BACKGROUND

The phrase "online grocery shopping" refers to a technique for buying products, particularly groceries, using a web-based service. There are various techniques for providing this service. As an example, a large company, such as AMAZON, can provide the service and ship items directly to a user's home. As another example, a grocery store can provide an online service for the user. The user's groceries can be ordered online, and the user can then either pick up the groceries at the local grocery store or the store can deliver them to the user's house.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In some aspects, the techniques described herein relate to a method for standardizing a catalog of data and for using the standardized data to implement various application programming interfaces (APIs), said method being implemented by a service and including: receiving non-standardized data including data that includes (i) information describing a plurality of items, said information being obtained from a first domain, (ii) customer information that is also obtained from the first domain, and (iii) unstructured review data obtained from a second domain that is different from the first domain; converting a first format of the non-standardized data into a second, standardized format, resulting in generation of standardized data, wherein: the standardized data includes a hierarchy including a plurality of defined categories into which various portions of the standardized data are categorized, each defined category in the plurality of defined categories is associated with a corresponding set of attribute types that describe various attributes for said each defined category, the standardized data includes anonymized profiles including a customer identification (ID) linked to the customer information, and the unstructured review data is provided structure; and generating a data model that includes the standardized data, wherein the standardized data is made accessible to one or more APIs via an ID key.

In some aspects, the techniques described herein relate to a computer system that accesses standardized data and that enables one or more application programming interfaces (APIs) to perform operations using the standardized data, said computer system including: a processor system; and a storage system that stores instructions that are executable by the processor system to cause the computer system to: access standardized data that is formatted in accordance with a standardized format, wherein: the standardized data includes a hierarchy including a plurality of defined categories into which various portions of the standardized data are categorized, each defined category in the plurality of defined categories is associated with a corresponding set of attribute types that describe various attributes for said each defined category, wherein a number of attribute types for each defined category in the plurality of defined categories exceeds 15 attribute types; the standardized data includes anonymized profiles including a customer identification (ID) linked to customer information, and unstructured review data is provided structure and is included in the standardized data; provide an experiences API access to the standardized data, wherein the access is provided by way of one or more identification (ID) keys that facilitate the access to the standardized data; and in response to user input including a search parameter, trigger execution of the experiences API, wherein execution of the experiences API includes: determining an ID key for the search parameter; identifying a set of attribute types associated with the ID key; using the ID key to search the standardized data in an attempt to identify one or more items that have a threshold number of attribute types that match the set of attribute types associated with the ID key for the search parameter, such that the identified one or more items are identified as a result of those one or more items being determined to be relevant to the search parameter; and displaying, within a user interface, the one or more items.

In some aspects, the techniques described herein relate to a method for accessing standardized data and for enabling one or more application programming interfaces (APIs) to perform operations using the standardized data, said method being implemented by a service and including: accessing standardized data that is formatted in accordance with a standardized format, wherein: the standardized data includes a hierarchy including a plurality of defined categories into which various portions of the standardized data are categorized, each defined category in the plurality of defined categories is associated with a corresponding set of attribute types that describe various attributes for said each defined category, wherein a number of attribute types for each defined category in the plurality of defined categories exceeds 15 attribute types; the standardized data includes anonymized profiles including a customer identification (ID) linked to customer information, and unstructured review data is provided structure and is included in the standardized data; providing an experiences API access to the standardized data, wherein the access is provided by way of one or more identification (ID) keys that facilitate the access to the standardized data; and in response to user input including a search parameter, triggering execution of the experiences API, wherein execution of the experiences API includes: determining an ID key for the search parameter; identifying a set of attribute types associated with the ID key; using the ID key to search the standardized data in an attempt to identify one or more items that have a threshold number of attribute types that match the set of attribute types associated with the ID key for the search parameter, such that the identified one or more items are identified as a result of those one or more items being determined to be relevant to the search parameter; and displaying, within a user interface, the one or more items.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 3 illustrates one example of a category that can be generated as a result of standardizing data.

FIG. 5 illustrates an example of non-standardized data.

FIG. 6 illustrates an example of standardized data, where each item is included in a category comprising a large number of attribute types and where each item is classified in accordance with those attribute types.

FIG. 13 illustrates an example of an aisle plan group.

FIG. 14 illustrates different aisle plans.

FIG. 18 illustrates additional analytics for the campaigns.

FIG. 22 illustrates a user interface configured to enable bids to be modified.

DETAILED DESCRIPTION

Figure 1:
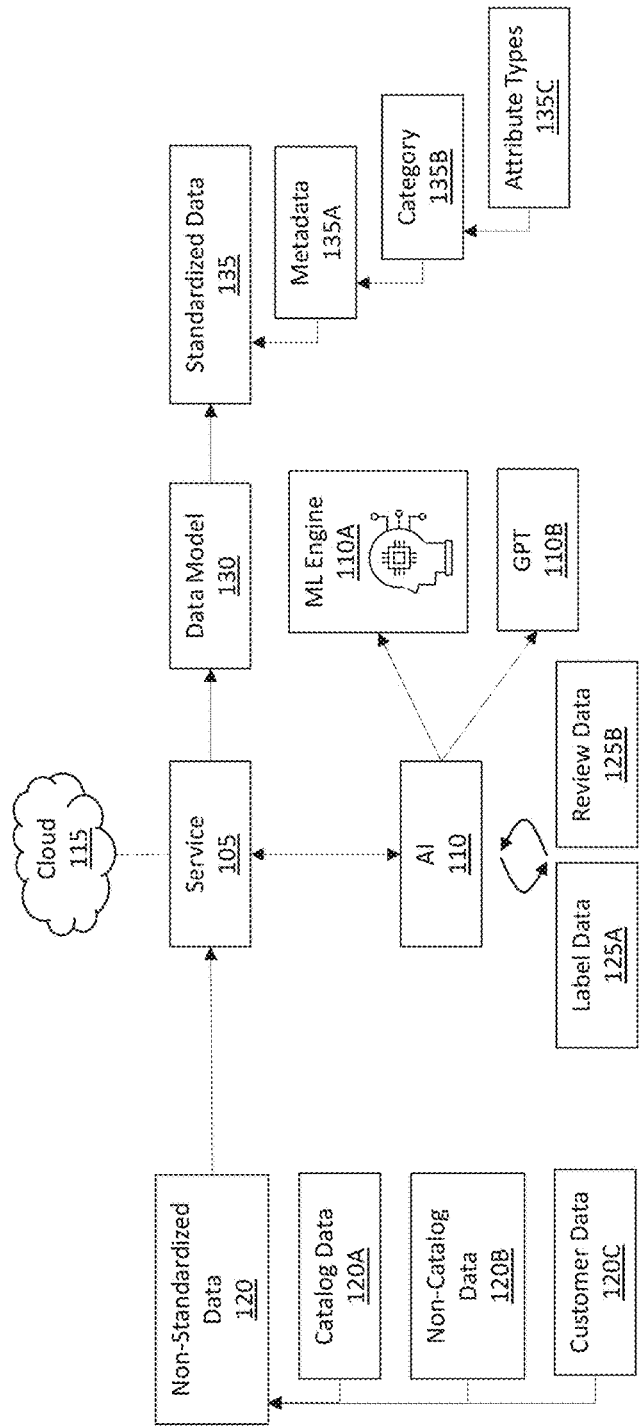
FIG. 1 illustrates an example architecture that can standardize data.

Online grocery shopping has provided many benefits to the lives of users. For instance, users are provided with increased convenience in how purchases are made and in how products are selected. When a person visits a brick-and-mortar store looking for a particular item, it may take that person a significant amount of time to locate the item. Furthermore, the person may not be aware of alternative items that are located elsewhere in the store. Providing a platform for online grocery shopping, or any type of shopping more generally, has greatly improved users' abilities to identify and consider multiple different options.

To facilitate online shopping, businesses often utilize a catalog of products that they provide. This catalog operates as the foundational backbone for the business's online shopping presence. Traditional catalogs include a name for a product and a limited or sparse amount of details about that product. As an example, a traditional catalog might include the following product: "Amnon's Kosher Pizza." The catalog might further include the size (e.g., 12 oz box), a general listing of ingredients for the product, and the nutritional facts for the product. It may be the case that a business has hundreds, thousands, hundreds of thousands, or even millions of products listed in a catalog.

The catalog is then used to publish products on a website serviced by an online shopping service. Because the catalog provides only a sparse amount of information for each product, the ability of the online shopping service to provide enhanced shopping experiences for users has often been hindered. For instance, traditional online shopping services have provided the option to surface a limited number of alternatives for a product or a limited number of variations for a product. The limitations associated with the online shopping service are due to the fact that the catalog is sparse and is also non-standardized.

By "standardized," it is meant that a collection of data (e.g., product data relating to multiple different products) is transformed from a first format to a second format, where that second format adheres to a predetermined standard or scheme. Thus, the data, in its entirety, collectively adheres to the common standard. The term "non-standardized" refers to a collection of data that has not been transformed in the manner described above and thus does not collectively adhere to a common standard. Data in traditional catalogs has not been standardized. One reason as to why data in catalogs has not been standardized is due to the significant amount of time and effort that would be involved to standardize that data. Businesses are often unwilling to spend time and resources to standardize their data.

As an example, it is often the case that data in a traditional catalog has spelling errors relating to the name of the product, brand, or characteristics of the product. For instance, if the brand name for Amnon's Kosher Pizza is "Amnon" and if the brand included another product (e.g., pepperoni pizza), it was often the case that a spelling error in the brand name was included in the catalog (e.g., perhaps "Ammon"). If this error existed, the two pizza products would not be categorized together based on brand because the catalog data was not standardized and checked for accuracy.

Spelling inconsistencies is just one example of a problem that existed with traditional catalogs. Additional problems surfaced with the use of traditional catalogs. For instance, traditional catalogs are difficult to update as new attributes of products emerge. As one example, the attribute "gluten free" has recently emerged as being a product attribute that many shoppers are interested in. If the traditional catalog included a listing of ingredients for a product but no indication of being gluten free for that product, then that product was often not categorized as being gluten free even though it might actually be based on the ingredient list.

What is needed, therefore, particularly in the online shopping realm, is an improved technique for intelligently standardizing data so that the resulting data does not simply include a sparse or limited listing of attributes but rather so that the resulting data includes a very large number of attributes (e.g., over 20, 30, 40, 50, 60, 70, 80, 90, 100, or sometimes even over 100 attributes) per item or product. As used herein, the terms "item" and "product" are used interchangeably. These attributes can be determined from label data as well as data pulled from sources external to a product (e.g., perhaps review data). This data is then transformed from its existing format to a standardized format. By standardizing the data in the manner described in this disclosure, significant benefits, advantages, and practical applications can be realized.

For instance, by using standardized data, the embodiments are able to significantly improve the functionality of various application programming interfaces (APIs) that operate using the data. As one example, consider a so-called "variations" API, which is tasked with identifying alternative options for a given product. By feeding the variations API standardized data, where each product has at least a threshold number of attributes (e.g., 20, 30, or more than 30), the ability of the variations API to identify worthwhile variations for a given product is enhanced. This enhancement also improves the user's ability to interact with the service. By standardizing the data, the embodiments also enable the disclosed service to operate in a more efficient manner in responding to various queries. Accordingly, these and numerous other benefits will be discussed in more detail throughout the remaining portions of this disclosure.

Example Architecture

Attention will now be directed to FIG. 1, which illustrates an architecture 100 that can be used to provide the disclosed benefits. Architecture 100 includes a service 105. As used herein, the term "service" refers to an automated program that is tasked with performing different actions based on input. In some cases, service 105 can be a deterministic service that operates fully given a set of inputs and without a randomization factor. In other cases, service 105 can be or can include any type of artificial intelligence engine 110, such as a machine learning (ML) engine 110A or a generative pre-trained transformer (GPT) 110B, thereby enabling service 105 to operate even when faced with a randomization factor.

As used herein, reference to any type of machine learning or artificial intelligence may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model (s), support vector machine(s) ("SVM"), artificial intelligence device(s), or any other type of intelligent computing system. Any amount of training data may be used (and perhaps later refined) to train the machine learning algorithm to dynamically perform the disclosed operations.

In some implementations, service 105 is a local service implemented on a personal computer (PC) or other type of computing device. In some implementations, service 105 is a cloud service operating in a cloud 115 environment. In some implementations, service 105 is a hybrid type of service that includes a local component operating on a local system and a cloud component operating in the cloud 115 environment. Those two components can cooperate with one another via various exchanged communications.

Generally, service 105 is tasked with receiving data about any number of cataloged items and then generating a list of attributes that can be queried (or otherwise acted upon) for the items in the catalog. Service 105 also standardizes the items as well as any other information included in the catalog about the items. In the context of the online shopping example, service 105 is able to receive a business or grocer's catalog and then facilitate the standardization of that catalog. Additionally, service 105 obtains and/or generates additional information for the items listed in the catalog so as to increase the number of attributes that are associated with a given product/item in the catalog. ML engine 110A and/or GPT 110B is also able to implement a heightened level of intelligence with regard to the standardization process. Further details on these aspects will be provided shortly.

FIG. 1 shows how service 105 is able to obtain or otherwise access non-standardized data 120. As one example, non-standardized data 120 may include a business/ grocer's catalog data 120A. Catalog data 120A may include a listing of products that the business has made available for purchase via an online shopping forum. Catalog data 120A may also include supplemental or supporting information for the products in the catalog, such as a listing of ingredients, nutritional facts, or perhaps a parts list.

Non-standardized data 120 may further include non-catalog data 120B, which refers to data that is not included in a catalog of products. As one example, non-catalog data 120B may include review data that has been provided within the domain (e.g., the website) of the online shopping forum. For instance, if the product is listed for sale on the online shopping forum, one or more users may have submitted a user review of the product on the online shopping forum. Thus, the user review was submitted in the same domain as where the product is being sold (e.g., the domain being the online shopping forum). Service 105 is able to acquire this non-catalog data 120B.

Non-standardized data 120 may further include customer data 120C, which refers to data that is not included in a catalog of products. As one example, customer data 120C may include profile information for past, current, or prospective users of the online shopping forum. This profile information can include information about a user, such as the user's name, alias, age, gender, past purchases, shopping preferences, and so on.

Service 105, including the ML engine 110A and/or GPT 110B, also includes functionality for acquiring label data 125A for a product outside of the domain where the product is being sold and/or outside of the catalog in which it is listed. As an example, service 105 includes functionality for performing an Internet search on a given product and obtaining additional information about that product, where that additional information is obtained from a source that is not the same as the online shopping forum. That source can be any type of source. Examples of such sources include, but certainly are not limited to, any type of social media platform, other online shopping forums, or any other type of website. Label data 125A may include any additional information about a given product. As some examples, the additional information may include any type of health-related data (e.g., allergy data), recall data, avoidance data (e.g., one product should not be used with another product), and so forth, without limit.

Service 105, including the ML engine 110A and/or GPT 110B, is also able to scour the Internet to identify additional review data 125B about a given product. This review data 125B is also obtained from a source or domain that is different from the online shopping forum mentioned above. Examples of such sources also include social media posts, blogs, forums, and so on, without limit. In some cases, review data 125B might include unstructured data, such as sentimental text describing a product. In some cases, review data 125B might include structured data, such as a 1-5 star rating or other quantified rating technique. Service 105 is able to provide structure to the sentimental text, or rather to the unstructured data.

For instance, the ML engine 110A and/or GPT 110B may include a natural language processing (NLP) engine that is able to determine a sentiment associated with a body of text. This sentiment can then be quantized into a given value, thereby providing structure to text. As an example, suppose one user review said the following: "this product is the worst thing ever, nothing is worse than this." The NLP engine can analyze the text and assign a rating value to it. For instance, if a rating scale of 0-10 were used, where a value of "0" indicates a negative sentiment and a value of "10" indicates a positive sentiment, the NLP engine may assign the text a "0" rating, thereby providing structure to the previously unstructured text. Accordingly, the service 105 is able to obtain domain specific information (e.g., information pulled from a catalog or pulled from a website associated with a given online shopping forum) as well as obtain information from other domains.

With this information, service 105 is then able to generate a data model 130 for a given product or for any number of given products. For instance, if a catalog includes 300,000 products, service 105 is able to generate a data model 130 that includes detailed attributes for those products and that generates a mapping for those products, where the mapping identifies explicit, implicit, or inferred relationships between the various different products. Further details on this aspect will be provided shortly.

Data model 130 represents a set of standardized data 135. That is, service 105 received data that may have been formatted in numerous different formats. Service 105 then transformed or mapped that data from the numerous different formats all into a single, common, standardized format, thereby producing the standardized data 135. In FIG. 1, standardized data 135 is shown as including a scenario where metadata 135A is provided for each item/product. Metadata 135A includes a determined category 135B for the item as well as any number of attribute types 135C for that determined category 135B.

As used herein, the term "category" refers to a general classification for a given group of products, where that general classification is based on determined characteristics for the products. Stated differently, a group of products may share a general characteristic with one another. Based on this shared characteristic, the embodiments are able to generate a category for that group of products. As an example, if a product is named "Amnon's Rising Crust Pizza," that product may be assigned to the category "frozen pizza" because it is a type of pizza that a customer takes home and bakes at home. The embodiments are able to generate any number of categories for products.

As used herein, the phrase "attribute type" refers to characteristics, features, or attributes of products that are included in a specific category. That is, a given category may be assigned any number of attribute types based on the characteristics of the items/products that are assigned to a given category. Thus, while a "category" generally describes a group of products, the "attribute types" describe the products in a more detailed or granular manner. Using the "frozen pizza" category as an example, some of the attribute types for that category may include "brand," "sub-brand," "rising crust," "gluten free," and so on. Thus, the attribute types refer to specific characteristics of items that are included in a given category. Further examples will be provided shortly.

Stated differently, using the input data provided to service 105, service 105 (in particular the ML engine 110A and/or GPT 110B) is able to generate any number of categories for the products in a catalog. Service 105 is further able to identify all the attribute types that are of interest to a client and to a given category. Using the above example, a "category" can be something like "frozen pizza." An attribute type for that category can be something like "gluten free." Service 105 is able to scour the Internet to find categories for groupings of products and to find attribute types that are relevant for a given category. As new products, categories, or attribute types emerge, service 105 is able to respond and adapt to those new products, categories, or attribute types by including them in the data model 130.

In this manner, service 105 is able to identify a given product and then flow or assign that product to a given category. If a relevant category has not yet been generated for that product, then service 105 is able to generate a new category for the product. Once assigned to a category, then the attribute types for that category can also be assigned to the product. It may be the case that not all of the items in a given category have all of the attribute types assigned to that category. In such a scenario, the data model 130 can reflect a "false" or "negative" value for that product in that given attribute type. In this manner, service 105 is able to provide standardized data 135 for a listing of products.

It should also be noted how the number of attribute types for each category can be unbounded. Often, the number of attribute types for a given category exceeds 20. As some examples, the number of attribute types for a given category can be anywhere from 20 to 100, or perhaps even more than 100. Service 105 facilitates the generation and assignment of categories and attribute types to items. In doing so, each item/product is associated with a highly granularized description, which can then be used by various different APIs to perform various different operations. By standardizing data in this manner, the embodiments are able to provide a heightened level of services to customers, where this heightened level exceeds traditional techniques due to the high quality (e.g., granularized categorization and classification) of the underlying data.

Because each item/product is now categorized and classified in a highly granularized manner, service 105 can then also identify linkages or relationships between products and include those relationships in the data model 130. For instance, items can now be linked or related to one another based on the categories and/or based on any of the attribute types for the items. ML engine 110A and/or GPT 110B can also be used to further identify relationships between items. Thus, the data model 130 not only includes a granular, standardized description for items, but it also includes linkages and relationships between those items, and these relationships can be queried and used by various APIs to provide a heightened level of services to users.

Figure 2:
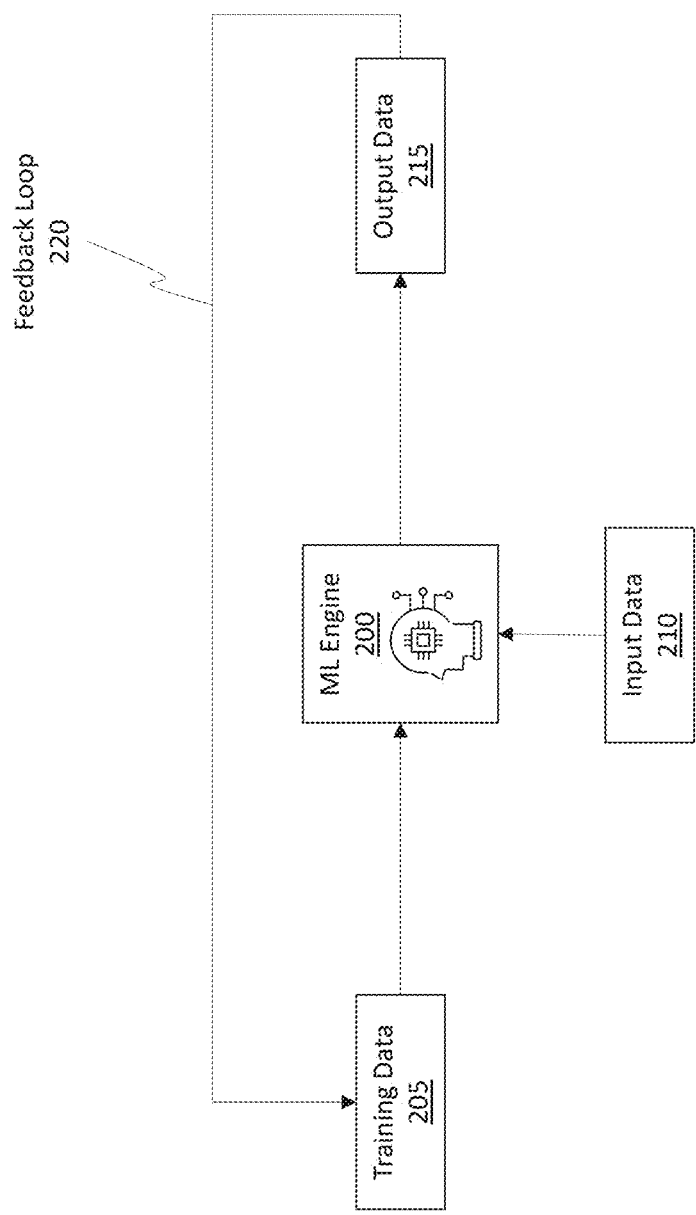
FIG. 2 illustrates an example machine learning (ML) engine that can perform operations to facilitate the standardization of data.

FIG. 2 shows a ML engine 200 that is representative of ML engine 110A from FIG. 1. In this example scenario, ML engine 200 is being fed training data 205 that may include any of the input data shown in FIG. 1 (e.g., the non-standardized data 120, label data 125A, and review data 125B) as well as any other input data. ML engine 200 is then trained on that training data 205. This training process can be a supervised training process or an unsupervised training process.

ML engine 200 then receives input data 210, which may also include any of the input data shown in FIG. 1. ML engine 200 operates on the input data 210 using its training to then generate output data 215. Output data 215 includes categories, attribute types, relationship data, and so on for products in a given catalog. Optionally, the output data 215 can later be fed as training data to further train or tune ML engine 200, as shown by feedback loop 220. Thus, the embodiments are able to learn over time and apply new learning to future classifications of data.

Categories And Attribute Types

FIG. 3 shows one example of a generated category 300. In this example, the category 300 is named "Frozen Pizza." Category 300 can be assigned to any pizza product that would be baked at a customer's home and that is frozen.

In accordance with the disclosed principles, service 105 from FIG. 1 also generated a number of attribute types 305 for the category 300. As some non-limiting examples, attribute types 305 include "Brand," "Rising Crust," "Organic," "Gluten Free," and so on, as shown by the ellipsis 310. It is often the case that multiple tens of attribute types are determined for a given category. The attribute types refer to characteristics that are of interest to customers who may purchase a product that is assigned to a given category.

FIG. 3 also shows how each attribute type is associated with a value type 315, such as a text value, Boolean value, number value, and so on, without limit. Additionally, each attribute type may be assigned an identification (ID) 320, which can be maintained and tracked in the data model.

The embodiments also include intelligence for determining related terms or synonyms 325 for each of the attribute types 305. Thus, if a user enters a query with a term or phrase that does not strictly match one of the attribute types 305, the embodiments are able to determine whether the term or phrase is a synonym 325 for the attribute types 305. In this sense, the embodiments are highly dynamic and can respond to different inputs, even if those inputs are different than data that is currently maintained by the embodiments. In some cases, the NLP engine can be called on to determine whether a term or phrase is a synonym.

The embodiments are further able to determine relationships 330 between attribute types and categories. For instance, one category may be related to another category, or one attribute type may be related to a different attribute type. The embodiments are able to identify and maintain these references. In some implementations, a ranking 335 system can also be used. For instance, the different attribute types 305 may be ranked by the disclosed service based on one or more parameters.

As one example, the attribute types 305 may be ranked based on the level of importance that each attribute type has for customers. For instance, in the category of "Frozen Pizza," it may be the case that the "brand" attribute type is ranked the highest while the "peanut free" attribute type is ranked the lowest. In some implementations, the ranking parameter can be based on popularity of an attribute type for a given product.

Figure 4:
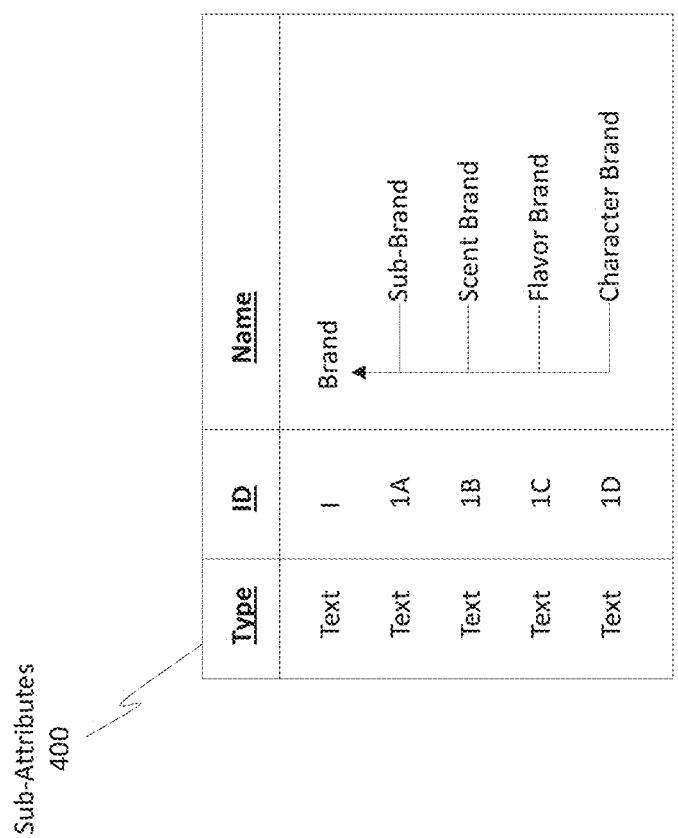
FIG. 4 illustrates various sub-attributes of a category.

Some of the attribute types can include additional or hierarchical data, as shown in FIG. 4. For instance, the attribute type "Brand" is shown as including a number of sub-attributes 400, which include "Sub-Brand," "Scent Brand," "Flavor Brand," and "Character Brand." These sub-attributes 400 are nested in the overall attribute type "Brand," and they can operate as metadata or supporting data for that attribute type. Each of the sub-attributes can be provided an ID. In some cases, a sub-attribute can also include its own set of sub-attributes. Another example of a sub-attribute includes "Flavor Hierarchies." As one example, a flavor hierarchy may include a top-level "fruit" attribute, a sub-level "berry" attribute, a further sub-level "strawberry" attribute, and a bottom-level "Slammin' Strawberry" attribute. As another example, a hierarchy may include a "category level" attribute, a "quality level" attribute, and then a "unit level" attribute. Thus, different sub-attributes can be defined.

FIG. 5 shows one example of a set of non-standardized data 500. This data includes eight line items, though the ellipses 505 indicates that many more line items can be included in the data. In fact, may grocers' catalogs, which are examples of non-standardized data, include multiple hundreds of thousands of line items of products.

In FIG. 5, the data 500 is shown as including a universal product code (UPC), a product name, an amount, and a price for each item/product. Often, this is the entirety of the information that is included in a grocer's catalog.

Notice, the line items in the data 500 are clearly not standardized in that they are formatted differently. For instance, the lengths of the UPCs vary, some of the spellings for the brand names are different (e.g., "Amnons" versus "Amnon's"), some of the spelling for the products are different (e.g., "Pizza" versus "Piz." and "Four Cheese Pizza" versus "4 Cheese"), some of the amount listings are formatted differently (e.g., "ounce" versus "oz" versus "OZ" versus "oz."), and even the price listings are formatted differently (e.g., "$17.91" versus "7.7" versus "7.99").

FIG. 6 shows a set of standardized data 600 based on the non-standardized data 500 of FIG. 5. More particularly, FIG. 6 shows two line items (though many more will actually be generated) of standardized data. The standardized data 600 is shown as including numerous standardized fields, including UPC, name, amount, price, attribute 605, attribute 610, and attribute 615. The ellipses 620 demonstrates how numerous other attribute types may be listed. As mentioned previously, it is often that case that many tens of attribute types are assigned to a product.

For instance, these products may be categorized in the "Frozen Pizza" category. As a result of various standardization operations being implemented on the non-standardized data, each line item in the standardized data 600 may have the attribute types listed in FIG. 3 (e.g., at least 17 attribute types, though likely many more). Thus, the ellipses 620 would include at least 10 additional attribute types, though it is likely that many dozens more would be provided.

The data has also been standardized to fit a common format. For instance, the UPC attribute type is a standardized attribute type and may be formatted to include a certain number of alphanumeric values. Optionally, blank spaces can be filled and operate as placeholders if the original UPC did not include a certain number of alphanumeric values. The other attribute types are also mapped or otherwise transformed to comply with various formatting requirements. As another example, the "Amount" attribute type is standardized to be of the following format: "xx oz yy" where "xx" denotes the size in ounces and "yy" denotes the packaging type. The "Price" attribute type also conforms to a particular format. The other attributes (e.g., attributes 605, 610, and 615) are similarly caused to conform to a preexisting format scheme. Thus, the embodiments receive, as input, non-standardized data. The embodiments perform an analysis on that data and then transform or map it from one format to a second, standardized format. Additionally, the embodiments are able to acquire supplemental data for each item and optionally include that supplemental data in the data model for the products/items. As a result, each product/item in the standardized data 600 is often provided many dozens of attribute types, much more than has traditionally been assigned to products/items. The embodiments are able to perform this standardization using machine learning to produce high quality data.

The embodiments are also able to resolve various different spelling mistakes and other inconsistencies that are often included in non-standardized data. By utilizing the NLP engine and the ML engine, the embodiments are able to fix typographical errors, determine attribute types and values for those attribute types, and perform other actions. In doing so, the embodiments ensure that the line items in the standardized data 600 include consistent data that can be mapped or otherwise have relationships formed with other standardized data. For instance, the embodiments are able to receive, as input, listings of items that customers have previously purchased. The embodiments are able to further standardize purchase history information for customers and use that information for subsequent operations, as will be described in more detail later.

Thus, the embodiments employ a highly intelligent and granular scheme for categorizing and classifying data so as to produce standardized data. By standardizing data in a highly granular manner, the embodiments are able to produce high quality data that can be operated on in numerous different ways, as will be described shortly.

Using Standardized Data With Advanced APIs

Figure 7:
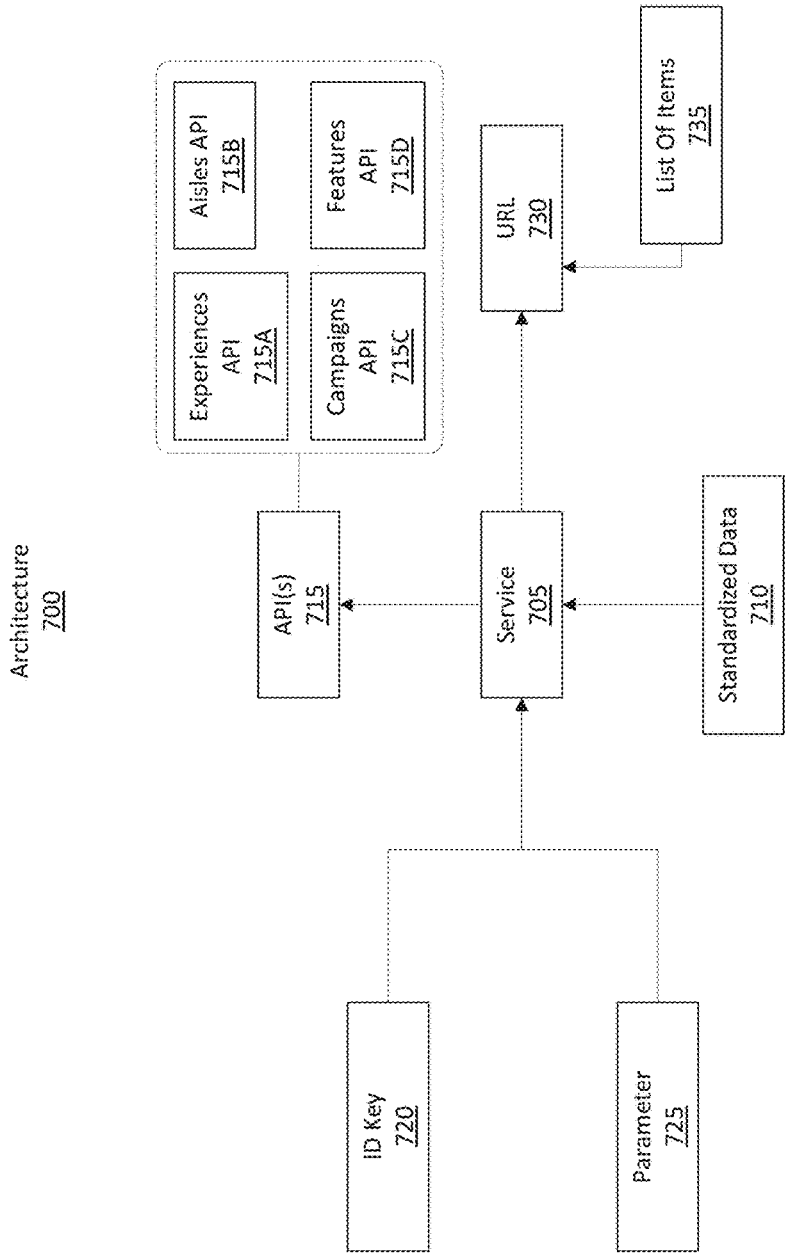
FIG. 7 illustrates an example architecture in which the standardized data is used by different application programming interfaces (APIs).

FIG. 7 shows an example architecture 700. Architecture 700 can be an add-on to the architecture 100 of FIG. 1. For instance, architecture 700 is shown as including a service 705. Service 705, in some instances, is representative of the service 105 from FIG. 1.

Service 705 is shown as having or accessing standardized data 710, which is representative of the standardized data 135 from FIG. 1 and standardized data 600 of FIG. 6. In some scenarios, the standardized data 710 may be stored on the same infrastructure that is hosting the service 705 while in other scenarios the standardized data 710 is stored on different infrastructure. In any event, service 705 is provided access to standardized data 710.

Service 705 also includes or has access to a number of API(s) 715. As a few, non-exhaustive examples, API(s) 715 include an experiences API 715A, an aisles API 715B, a campaigns API 715C, and a features API 715D. Other APIs will be discussed later. It should also be noted how future APIs can be added as well.

Service 705 is provided input, such as an ID key 720 and perhaps one or more other parameters, as shown by parameter 725. ID key 720 can be any type of ID key; examples of ID key 720 include, but are not limited to, a customer ID, a product ID, or even a category ID. Examples of the parameter 725 include, but are not limited to, any value corresponding to the attribute types listed earlier, filtering criteria, or any other parameter.

Service 705 receives the ID key 720 and possibly the parameter 725. Service 705 provides that input to the API(s) 715, which operate on the standardized data 710 using the input. The API(s) 715 then return output, such as in the form of a uniform resource locator (URL) 730 that can display a list of items 735 that were selected based on the input and based on the configuration of the API(s) 715.

As a specific example, suppose the service 705 is operating in the context of an online grocery shopping forum. Service 705 may include a search request for a frozen pizza. Service 705 is able to select one of the API(s) 715 (e.g., perhaps a search API included in the experiences API 715A) to facilitate the execution of the search. The search API may use the received input/parameters to conduct a search through the standardized data 710 in an attempt to find the requested product or products. The search API may then generate a list of one or more items that includes products/items that match or that are determined to satisfy a similarity threshold with the inputted data. This list of items 735 can then be returned to the user who entered the input in the form of a URL 730, which can be displayed to the user.

It should be noted that because the API(s) 715 operate using the standardized data 710, the quality of the results produced by the API(s) 715 is enhanced and is significantly better than the outputs provided by APIs that operate on non-standardized data. That is, the standardization that is performed on the underlying data enables the API(s) 715 to produce higher quality results, thereby providing an improved user experience.

Experiences APIs

Figure 8:
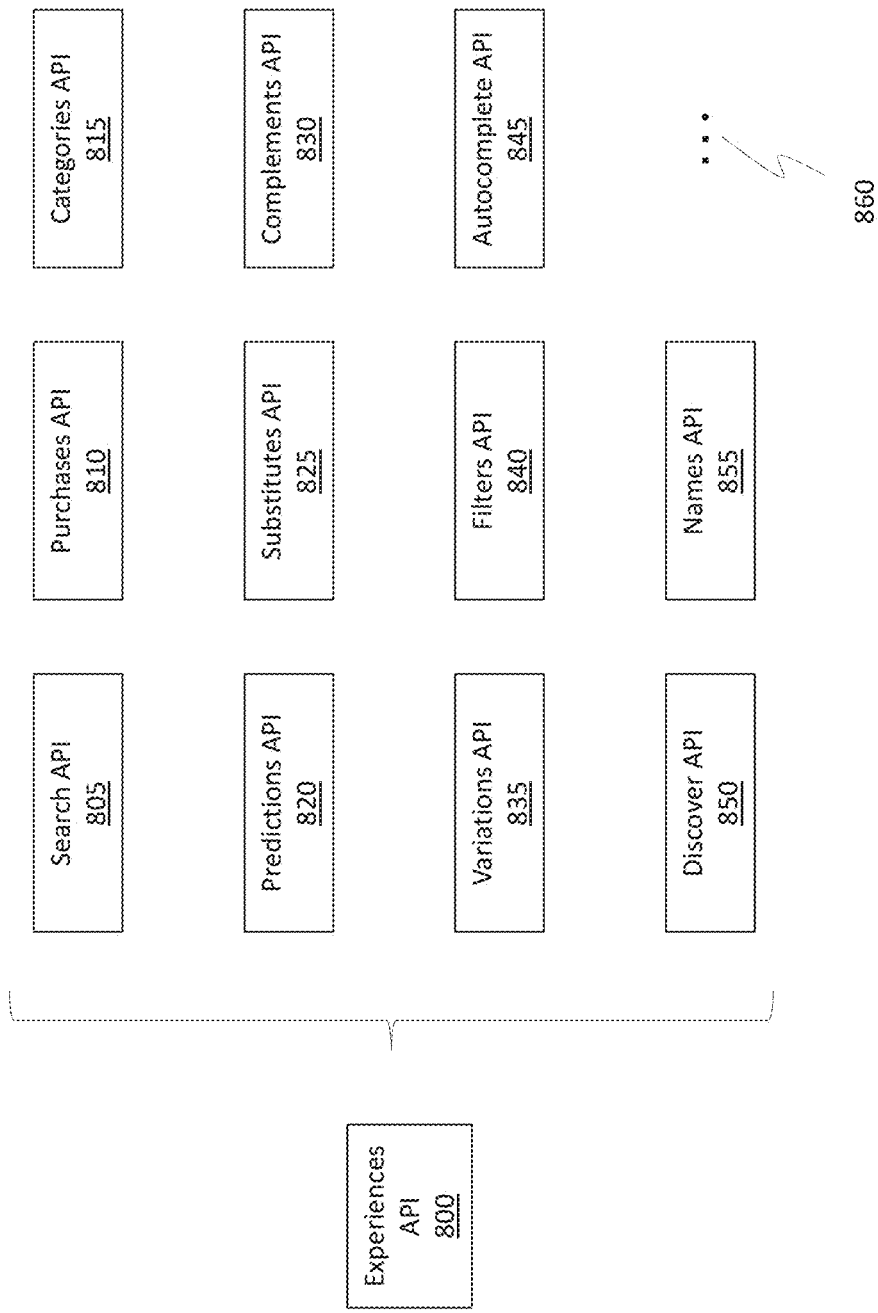
FIG. 8 illustrates various examples of APIs that are included as a part of an experiences API.

FIG. 8 shows the experiences API 800, which is representative of the experiences API 715A of FIG. 7. As mentioned above, the experiences API 800 operates using the standardized data. Often, the result of executing the experiences API is a list of items/products that are returned to a user in the form of a URL.

Experiences API 800 is shown as actually including multiple different APIs. These APIs include a search API 805, a purchases API 810, a categories API 815, a predictions API 820 a substitutes API 825, a complements API 830, a variations API 835, a filters API 840, an autocomplete API 845, a discover API 850, and a names API 855. The ellipses 860 demonstrates how other APIs may be included as well. A brief discussion on each of these APIs will now be provided. It should be noted how the results that are generated by these various different APIs are customized to a given customer based on that customer's historical or profile information.

Search API 805 receives as input one or more parameters and then uses those parameters to execute a query against the standardized data. Search API 805 then generates a personalized set of results for that query, where the results are returned to the user.

Traditional search engines start with traditional product data. As a result, even machine learning and AI powered engines are limited. In contrast, the search API 805 starts with standardized product data, which includes every attribute that matters to every customer for every product. It analyzes each search in real-time to filter and sort results based on the type of query.

Because the standardized data includes a significant number of attribute types for each product/item in the catalog, the ability of the search API 805 to provide highly customized and specific results is unparalleled as compared to traditional searching techniques that do not operate on standardized data. The parameters can be any type of parameter. Examples of such parameters include, but are not limited to, text descriptions of a product/item, a customer ID, a product ID, a category ID, and so on. Different logical operators (e.g., "AND", "OR", etc.) can be used to facilitate the searching process.

Purchases API 810 searches for past purchases for an individual customer. For example, purchases API 810 can receive, as input, a customer ID. That input is then fed into a query that executes on the standardized data, which includes data about customers and their profiles, including past purchases. Recall, the standardized data includes data not only about items/products in a catalog, but also items that a customer has previously purchased. The standardized data includes profile information for each known customer, and the profile data can be queried to identify past purchases the user has made. It is often the case that a customer will seek to repurchase an item the customer previously purchased. It may be the case that the customer does not recall exactly what was purchased, however. Purchases API 810 allows a customer to enter various parameters in an attempt to find that past purchase. Consequently, purchases API 810 provides a platform or framework for enabling a customer to rebuy the same product.

Categories API 815 generates a personalized set of results for a given category, where the personalized results are items that the categories API 815 determines are relevant to the customer. To be relevant, the embodiments may determine that the customer has previously purchased an item or that a particular item is related to one the customer has previously purchased.

The embodiments are able to determine the customer's preferences based on one or a combination of the customer's past purchase history, search history, or browsing trends. The customer can optionally enter a category ID, which is an ID for a particular category. Categories API 815 then uses that ID to execute a query against the standardized data. Categories API 815 then returns a set of results that are included in that category and that are determined to be relevant to the customer. Optionally, the embodiments are able to generate one or more predictions for the customer, where the predictions include items that the embodiments predict the customer is interested in and where the predictions are included in the category. The predictions API 820 can generate these predictions.

Predictions API 820 is able to access the customer's profile information, browsing history, and browsing trends. Predictions API 820 is then able to make the various predictions. In some implementations, the ML engine can be used to facilitate the generation of these predictions. For instance, the ML engine can compute or identify possible relationships between items that may be of interest to the customer based on historical data or behavior of the user and based on current browsing or search information. In some cases, the ML engine can also examine other domain information for the user. For instance, the ML engine may optionally be provided access to the customer's email or web browser. The ML engine can use this access to determine what items the customer has recently been interested in and/or purchased. Such information can influence the prediction generation operations of the ML engine.

Predictions API 820 can also predict what items a customer may be running low on or is out of. For instance, using the grocery shopping example, predictions API 820 can attempt to determine a frequency by which a customer uses a given product or repurchases a given product. If, based on the determined frequency, the time period for purchasing a given item is approaching, is due, or is past due, predictions API 820 can generate an alert or recommendation to a customer to inform the customer that the customer may want to consider repurchasing the given item. Accordingly, in some implementations, the predictions API 820 is able to predict what purchases a customer is running low on and then generate an alert to inform that customer of the situation. Optionally, the predictions API 820 can receive, as input, a customer ID and then generate the predictions for customer whose ID was entered.

Substitutes API 825 provides personalized substitutions for a product based on a product ID being entered as input. For instance, suppose a customer searches for "pepperoni pizza." Substitutes API 825 is able to query the standardized data in an attempt to find substitutes that match the customers preferences or historical purchase trends. Inasmuch as the standardized data includes a plethora of attribute types for each item, the embodiments are able to perform an expansive search on the standardized data in an attempt to identify other items that share a threshold level of similarity to the item (i.e. a "substitute") that the customer searched for. For instance, if the customer's past purchase history indicates that this particular customer only ordered a specific brand of pizza, the embodiments can generate a list of substitute items that are all of the same brand as the one the customer purchases. Pizzas of other brands may be excluded from the results list.

In some implementations, the substitutes API receives, as input, a single (or perhaps multiple) product IDs. This API then executes and returns a list of similar or substitutable items.

In some implementations, the substitutes API (or any of the other APIs mentioned herein) can be automatically integrated into the execution of yet a different API, such as perhaps the search API. For example, when the substitutes API is integrated into the search API, the search API may be called, and it may be the case that the search API returns less than a threshold number of items. If that is the case, then the embodiments may trigger the further execution of the substitutes API in an attempt to provide a final listing of items that includes a number that exceeds the minimum threshold. Thus, some embodiments automatically trigger the further execution of an additional API if an originally triggered API fails to return at least a threshold number of items.

There are various reasons as to why an originally triggered API might not be able to return at least the threshold number of items. As one example, suppose the search API is triggered. This search API may be dependent on what products are actually available in a store. If the store's inventory is currently low or depleted for a particular product or category of products, then the search API may not be able to return the threshold number of items. In such a scenario, another API may be called to help supplement the results from the search API.

As another example, if the customer only ever purchases "rising crust" frozen pepperoni pizza, the embodiments may exclude other crust types from the results list. As yet another example, the embodiments are able to infer conditions as well. For instance, a customer's past purchase history may indicate that this customer has purchased sausage, pepperoni, and various vegetable pizzas, but the customer has never purchased a ham pizza. In some cases, the customer's past search history may also include a search term that expressly restricts the search to not include ham. Based on the information that is available, the embodiments are able to infer that the customer does not prefer ham on his/her pizza. Based on this inference, the embodiments can avoid generating a results list that includes pizzas having ham.

Businesses (e.g., grocers) that use the substitutes API 825 can also power a scenario in which substitutions are provided when a customer is attempting to purchase an item that is currently out of stock. As an example, if a customer orders groceries online, it is often the case that a particular product is not currently available at the local grocery store. The substitutes API 825 is able to provide a robust set of alternative options (e.g., substitutions) for the requested product. Substitutes API 825 attempts to pick substitutions so that are most similar to the requested item. As a result, the embodiments avoid a scenario where the proffered item is one that is random or is one that does not closely match the originally requested item.

Figure 9:
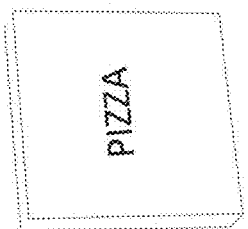
FIG. 9 illustrates an example user interface showing the results of executing a particular API.

Turning briefly to FIG. 9, FIG. 9 shows an example user interface (UI) 900 that lists a set of substitutes for a given product (e.g., in this case pizza). Notice, all of these substitutes share a common characteristic in that they are all types of pepperoni pizza. The embodiments selected these alternatives based on a determination that a primary consideration of the customer is the flavor of the pizza.

Returning to FIG. 8, the complements API 830 generates a personalized list of complementary items for a product, based on a product ID being entered as input. A complementary item is an item that is often used or purchased with another item.

As one example, if a customer loads hot dogs, buns, and ketchup in an online shopping cart, complements API 830 might also recommend the customer to purchase mustard. In some cases, the ML engine can be used to identify which items are complements of other items. The ML engine can make these inferences of complementary relationships based on the standardized data as well as based on Internet searches and a comprehensive review of multiple customer purchases.

The variations API 835 generates variation options for a product, based on a product ID being entered as input. Using the pizza example, the embodiments are able to generate variations on the toppings that the pizza includes. As yet another example, the embodiments are able to generate sized variations for diapers. For instance, the embodiments are able to track the purchase of the diapers and predict when a new size will likely be needed based on when the newborn or size one diapers were purchased. The embodiments are able to intelligently determine the age of an infant based on a customer's purchase history and then submit to the user choices that likely coincide with the predicted age of an infant. Accordingly, any type of variation can be provided to a customer based on the intelligent review and query of the standardized data.

In some implementations, variations include other products from the same brand and same category. A product can be varied on one or multiple attributes. That is, the variations can be single dimensional variations or multi-dimensional variations.

Figure 10:
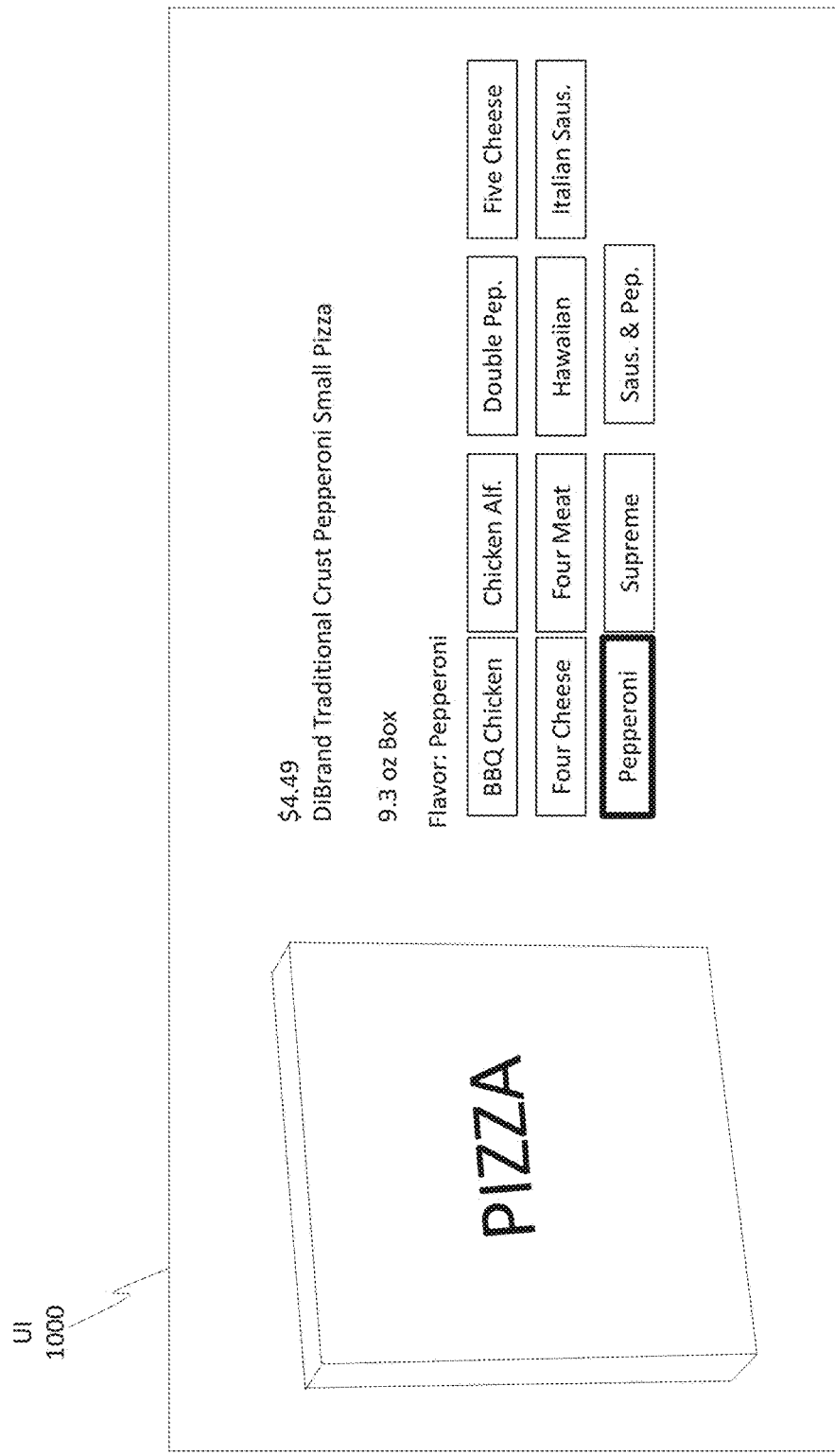
FIG. 10 illustrates another example user interface showing the results of executing an API.

Turning briefly to FIG. 10, FIG. 10 shows an example user interface (UI) 1000 that shows a list of available variations for a pizza product. Currently, the "pepperoni" option is selected. Notice, however, how a large number of variations for this particular brand are also displayed (e.g., the BBQ Chicken, Chicken Alf., and so on).

As mentioned above, the variations do not have to be just one variation; rather, the variations can include multiple different dimensions or variations. It should also be noted how the disclosed embodiments are able to provide variations across an entire catalog for a given business. This large-scale variation feature is available because the embodiments operate using standardized data, which operates as the foundation for identifying attribute types for data. Thus, the disclosed variations API, as well as all the other APIS, can operate across an entire catalog for a business.

Figure 11:
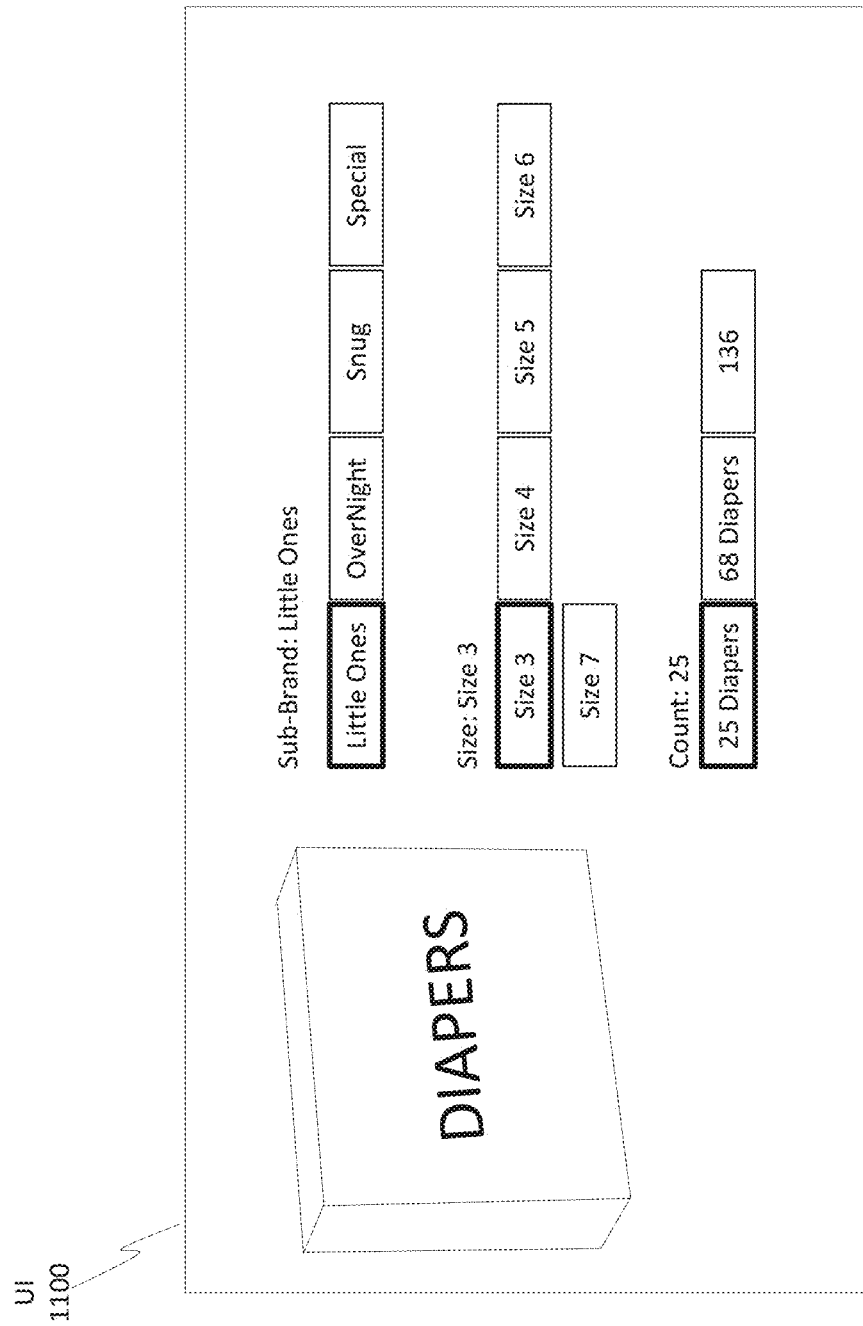
FIG. 11 illustrates another example user interface showing the results of executing an API.

FIG. 11 shows another example UI 1100 that shows a multi-dimensional variation. In this example, UI 1100 is showing variations for diapers, where the variations include variations on the sub-brand for diapers (e.g., nighttime versus daytime), the size of the diapers, and even the count of diapers.

Returning to FIG. 8, the filters API 840 generates a standardized set of filters for a product, based on a product ID being entered as input. For instance, when a customer enters a set of parameters to search for an item, a listing of items may then be generated. Often, the number of items that are returned is quite large, and a customer may want to further refine the listing by imposing a set of filtering constraints. The filters API 840 is able to provide a comprehensive set of filtering constraints or parameters that can be used to further narrow a set of search results. Traditionally, it was often the case that, due to spelling inconsistencies or other issues, duplicate or near duplicate filtering constraints were provided to a customer. The disclosed embodiments operate using standardized data. Doing so avoids a scenario where redundant or duplicate filtering constraints are provided to a customer.

The autocomplete API 845 generates potential search queries for a partially entered query parameter. In other words, autocomplete API 845 receives, as input, a query or a partial query and then automatically generates a complete query. This complete query is then executed to obtain a set of search results.

The autocomplete API 845 is a beneficial partner to any search experience. Customers lean on suggested searches for help with understanding product availability, search popularity, product naming, spelling, and more. Traditional autocomplete engines start with past customer searches. The autocomplete API 845, on the other hand, starts with the standardized product data and then builds every potential relevant autocompletion for every individual product. As a result, the autocomplete API 845 has the ability to suggest relevant keywords that have never been searched for by any customer.

The discover API 850 generates so-called "new-to-you" products for an individual customer, based on a product ID being entered as input. That is, discover API 850 identifies items that a customer has never previously purchased but that may be of interest to the customer based on that customer's past preferences, lifestyles, browsing history, search history, and so forth.

Finally, the names API 855 generates or identifies a standard name for a product. This operation is based on a product ID being entered as input.

Other APIs that are not listed but that can be included in the experiences API 800 include a products API, a customers API, and an events API. Regarding the products API, in some embodiments, one prerequisite for using the experiences APIs 800 as building blocks for a customer experience is that a business (e.g., a grocer) submits any product using that business's internal unique identifier, name, and detail page URL. After products are submitted, they will be standardized. After that, they will be available in all of the APIs.

Regarding the customers API, a business can submit customer order histories. For each customer, the business may submit an anonymized customer ID, list of orders, an anonymized order ID, and potentially a list of product IDs and quantities. After customer data is submitted, the embodiments build preferences, predictions, and recommendations for each customer. When a customer ID is entered as input into one of the APIs, the embodiments use the preferences to create personalized results.

Regarding the events API, a business is able to submit events that occur while customers are interacting with so-called "aisles" (i.e. places where the disclosed APIs are integrated, to be discussed in more detail shortly). Data submitted to the events API is used to improve the relevancy of results within the other APIs.

Aisles

FIG. 7 made reference to a so-called aisles API 715B. As used herein, the term "aisle" refers to a container that is used to submit shelf events via the events API. For example, an aisle can display results from a search request. Stated differently, an "aisle" is a UI element that is configured to display the results that are generated by any of the APIs mentioned herein. The embodiments are able to power aisles via the aisles API. For example, a search returns a list of products, and those products are displayed in an aisle.

Often, it is the case that businesses are desirous to move or shift items around in the displayed listing. The aisles API provides that option to businesses. For instance, the aisles API provides a framework or configurable template that can be used to define what characteristics an item is to have in order to be displayed at a particular position on a UI. As one can imagine, the most prominent locations on a UI are generally more valuable (e.g., in terms of advertising) as compared to locations that are buried or that are more obscure. The aisles API provides options to move items that are included in a set of results based on a set of defined criteria.

In other words, aisles give the ability for retailers/business to beneficially reorganize or customize the ordering of how results are displayed in the UI. The aisles API can be considered as being an API that sits on top of the experiences API, which relies on the standardized data. It should be noted how the option to reorganize search results is provided to the retailer or business entity via use of the aisles API. Generally, the aisles API can be used to generate a type of merchandising or advertising plan that determines how products show up when API results are returned to the customer.

Figure 12:
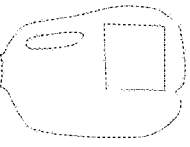
FIG. 12 illustrates an example user interface showing so-called "aisle slots."

FIG. 12 shows an example UI that is configured based on the aisles API to show a set of aisle results 1200. Notice, the aisle results 1200 include multiple different products of milk (e.g., different brands, types, etc.). Each product is displayed in a so-called "slot" 1205 or "UI slot." A "slot" refers to a UI element that can house or display a product. In FIG. 12, ten different slots are shown, resulting in ten different products being displayed. In this regard, the slots refer to the organizational layout for the website displaying the list of products.

Slot 1205 is displayed at the top left side of the UI. Often, this position in the UI is considered to be a prime spot for retailers who are seeking to advertise or sell their products. In contrast, slot 1210 is displayed at the bottom right side of the UI. This position is one that is less optimal for advertisement purposes than the prominent position of slot 1205. The aisles API allows businesses to give different priority levels to products displayed in the slots. Additionally, the aisles API allows the business to define certain criteria that a product must meet in order to be displayed in a particular slot.

The aisles API provides an option to a user/business to define a plan group, which is a definable set of conditions that are relied on to determine what types of products can be displayed in which slots. FIG. 13 shows five different examples of aisle plan groups 1300. For instance, one plan group is called "Search—Default," another plan group is called "Search—High Volume Items," and so on. Each of these plan groups includes a set of criteria for the slots and for products to meet in order to be displayed in a given slot.

The different plan groups can also be assigned different priority levels. For instance, the plan group called "Search—Vegetarian" is assigned the highest priority (priority #1) while the "Search—Default" is assigned the lowest priority (priority #5). This priority level dictates which plan group will be attempted first. If the highest priority plan group is not applicable based on the search results or perhaps based on the customer, then the plan group with the next highest plan group will be attempted. Thus, in FIG. 13, four plan groups will be attempted prior to the "Search—Default" plan group being implemented.

The embodiments pick or select a plan group based upon the context and the priority. Some businesses may desire to target different plans at each of those different customer groups. For instance, there may be times where a business would want a certain plan group to apply, such as in response to certain searches or certain customer groups being active. Such scenarios are referred to herein as "contexts," as shown in FIG. 13. So, under different contexts, different aisle plan groups may be implemented.

Analytics 1305 can also be collected and displayed for each of the different plan groups. These analytics 1305 include, but certainly are not limited to, any type of information related to the sale of items. For example, the analytics 1305 can include how often items are searched for, how often items are clicked on, how often items are added to a shopping cart, how often items are actually purchased, how often variations, substitutes, complements, or other items are selected and/or purchased, and so on. The analytics 1305 can also include or track sale history, referral history, and so on.

Within each aisle plan group (e.g., taking the "Search—Default" aisle plan group as an example) there is a set of one or more aisle plans, as shown by the aisle plans 1400 of FIG. 14. FIG. 14 shows that the "Search—Default" aisle plan group includes three different aisle plans, namely, the "Default" aisle plan, the "Past Purchase Focus" aisle plan, and the "Private Label Focused" aisle plan. Each of these plans is also afforded a weight (e.g., 90, 10, and 0). The weight indicates the probability that a particular plan will be implemented based on a random probability metric.

For instance, if the "Search—Default" aisle plan group is active, then that will cause any one of the three listed plans in FIG. 14 to be triggered. Ninety percent of the time, the "Default" plan will be triggered, ten percent of the time the "Past Purchase Focus" plan will be triggered, and zero percent of the time the "Private Label Focused" will be triggered. The embodiments use a random probability mechanism to determine which plan is triggered for execution. Accordingly, the embodiments are able to apply a weighted random choice with regards to which aisle plan will be selected. Operating in this manner can provide the user valuable information, such as information obtained from A/B testing. That is, providing these features enables users to determine which features or which aisle plan groups perform better, similar to how application features are tested during A/B testing. Thus, these options allow users to determine which plan accomplishes a grocer's particular goals.

Figure 15:
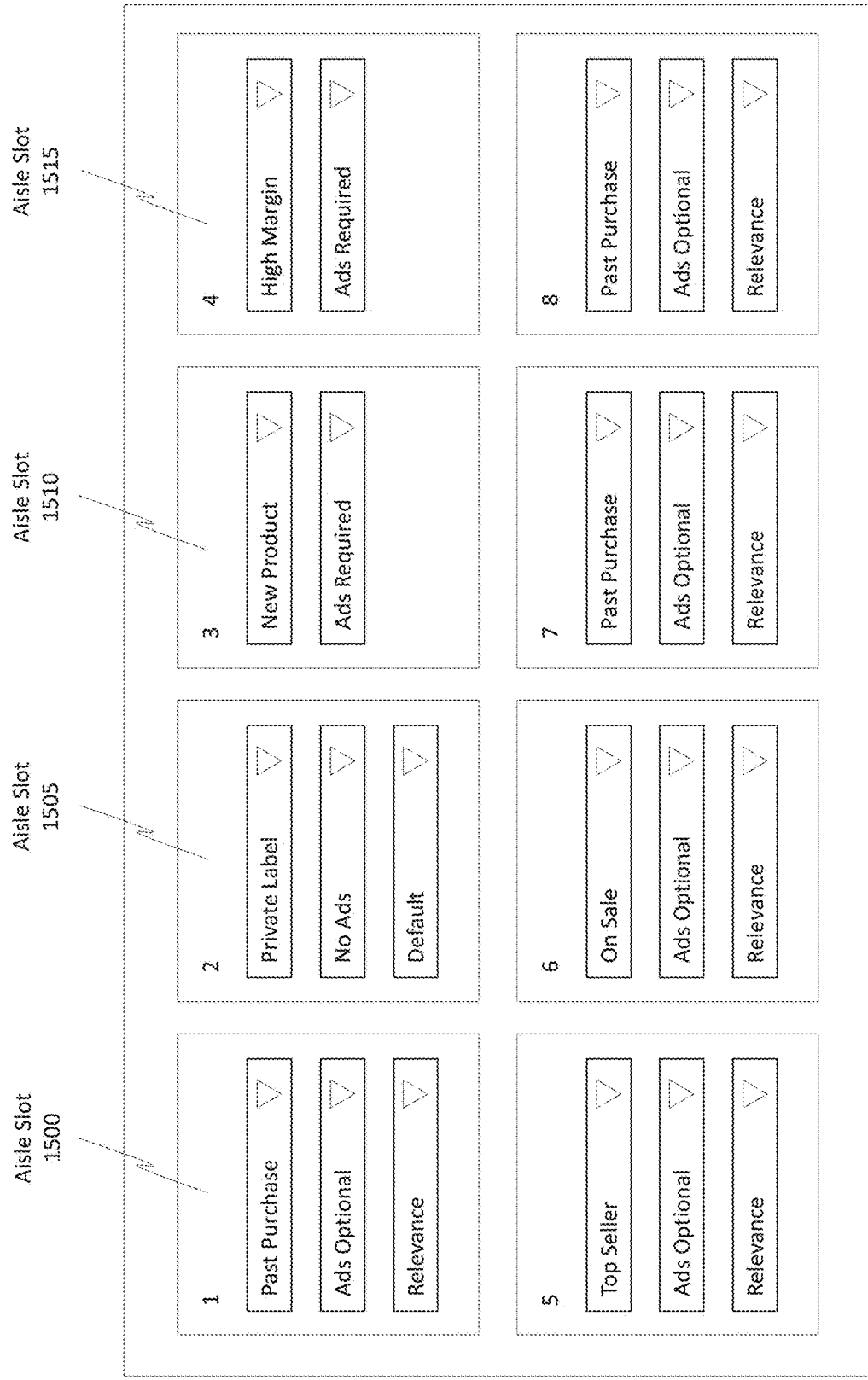
FIG. 15 illustrates how aisle slots can be configured.

Attention will now be directed to FIG. 15, which illustrates a number of slots (e.g., aisle slots 1500, 1505, 1510, and 1515) that are used to configure which products will be displayed in which areas of a UI. As an example, aisle slot 1500 corresponds to the position of slot 1205 from FIG. 12. Similarly, aisle slot 1505 corresponds to the next slot over in FIG. 12.

Each aisle slot includes a number of configurable parameters that will dictate which item/product will be displayed in that slot. For example, suppose the search API was executed. The search API will generate a set of items as a result of executing its operations. The search API natively organizes these items based on its own ordering criteria. In some cases, the business might want to reorder the results of the search API. The aisles API allows the business to do so by pre-specifying what type of product will be displayed in which slot position of the UI.

In FIG. 15, the aisle slot 1500 is currently configured in the following manner. First, an item that the customer has previously purchased is selected to fill that slot, as shown by the "Past Purchase" selected option. If none of the initial results satisfy this criteria, then the embodiments cause the next slot (e.g., aisle slot 1505) to fill that position in the UI.

Aisle slot 1500 includes various other criteria, as shown by the "optional" criteria, which relates to whether the item can be an advertisement or not, and the "relevance" criteria, which relates to how items are weighted based on how closely they match a customer's preference.

Each aisle slot can be customized in a unique manner. Thus, despite a search of items having an initial ordering or organization, the aisles API provides the option to a business to reorganize the results (obtained from any of the disclosed APIs) based on a set of predefined criteria. The display of those results is then governed by this new ordering, which is determined by the aisles API. Beneficially, the disclosed principles are highly scalable. For instance, the same plan can optionally be applied to any number of unique search terms. Indeed, the same plan can be applied to hundreds, thousands, or any number of unique search terms.

Campaigns

Using the campaigns API 715C from FIG. 7, businesses are able to promote their products across any of the experiences mentioned earlier. The campaigns API is controlled via the aisles API mentioned earlier. That is, an aisle is established prior to a business being able to use the campaigns API. Once an aisle is in place, then the business can use the campaigns API to begin to promote its products. As will be described in more detail later, the campaigns API is also configured to trigger a payment for an ad only when a purchase occurs.

Similarly, because the campaigns API is controlled by the underlying experiences, brands are also prevented from promoting their products if those products are not relevant to the currently active experience. For example, if a user were to search for a product, the resulting items that are displayed to the user are selected based on their relevance to the user and the user's search. If a brand is attempting to promote a product to the user, then that product is required to adhere to the current experience provided to the user. For example, that advertised product is one that relates to the user's search query. The campaigns API beneficially does not require an approval for ads, because the ads are already automatically controlled based on the experiences API and the underlying standardized data. The experiences API, using the standardized data, determines what ads are currently relevant to a user based on the user's currently active experience session.

Historically, ad selection and promotion was based on a brand selecting a key word and then displaying a product based on that key word. In contrast to these traditional techniques, the campaigns API relies on the experiences API and the underlying standardized data. The campaigns API allows a brand to select what product that brand would like to advertise. From there, the campaigns API surfaces the selected product during instances where that product is relevant to the user's current experience. Furthermore, the brand is not charged for the promotion or advertisement unless a user actually purchases the advertised product. Thus, there is no risk to the brand because the brand pays only when a purchase occurs based on the advertisement. Such processes are also entirely automated because of the use of the standardized data.

Figure 16:
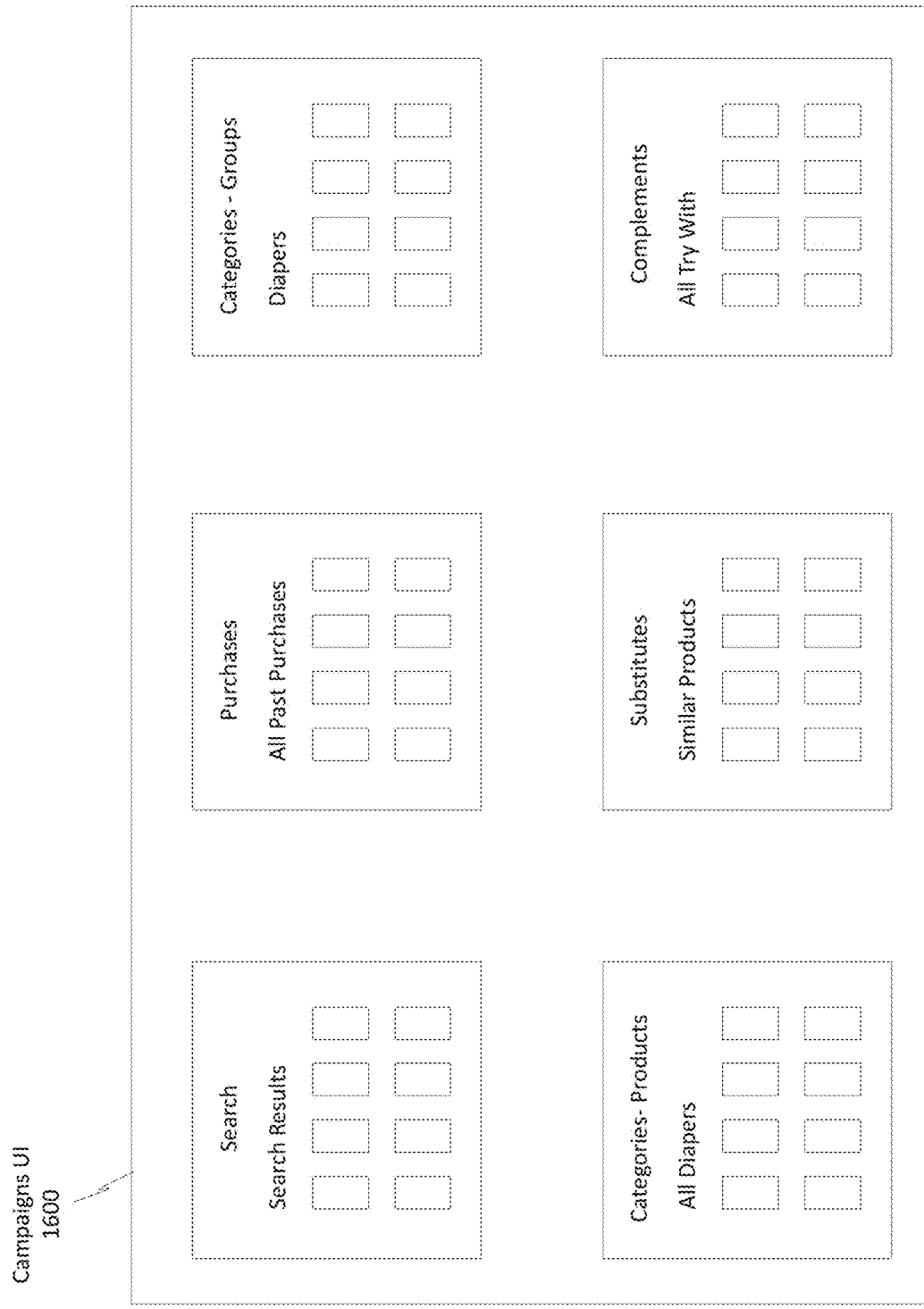
FIG. 16 illustrates a campaigns user interface in which campaigns can be launched to target specific user experiences.

FIG. 16 shows an example user interface referred to as a campaigns UI 1600. From this UI, a user or brand is able to establish a campaign using a pre-established aisle by targeting a specific experience. Some of the various different experiences are listed in FIG. 16.

In particular, FIG. 16 shows various different options for establishing a campaign for a particular experience (or aisle type). As some examples, campaigns can be created based on a user's search results experience, a user's past purchases experience, specific categories of grouped items (e.g., diapers) experience, specific products (e.g., all diapers) experience, similar substitutable products experience, and even a complements between items experience. Of course, these are just various examples of experiences for which campaigns can be established; other campaigns can also be established for other experiences/aisle types.

When a brand establishes a campaign, that brand selects a set of products for which the brand would like to be advertised to users. When the user subsequently interacts with the services and web platforms, the campaigns API will surface a product when the campaigns API determines that the product is relevant to the user's current experience. As an example, suppose a brand desired to promote a diaper. If a user entered a search query focused on diapers, then the brand's diaper product would be displayed to the user. On the other hand, if the user entered a search query focused on frozen pizza, then the brand's diaper product would not be displayed because the user's current search experience is directed to pizza and not to diapers.

The disclosed embodiments beneficially provide for the ability for brands to easily promote their products in any of the experiences mentioned earlier. Furthermore, as mentioned above, brands only pay for an advertisement campaign when their ad results in a real purchase. With the disclosed embodiments, brands can promote their products anywhere across any experience, but those brands pay only when their ad results in a real purchase.

Because the campaigns API is controlled by all the underlying experiences, brands are prevented from promoting their products where those products are not relevant based on the user's currently active experience. For instance, if a user is conducting a search, an advertised product is required to be relevant to that user's search query. If the past purchases experience is triggered, a brand's product is required to be relevant to the user's past purchases.

Figure 17:
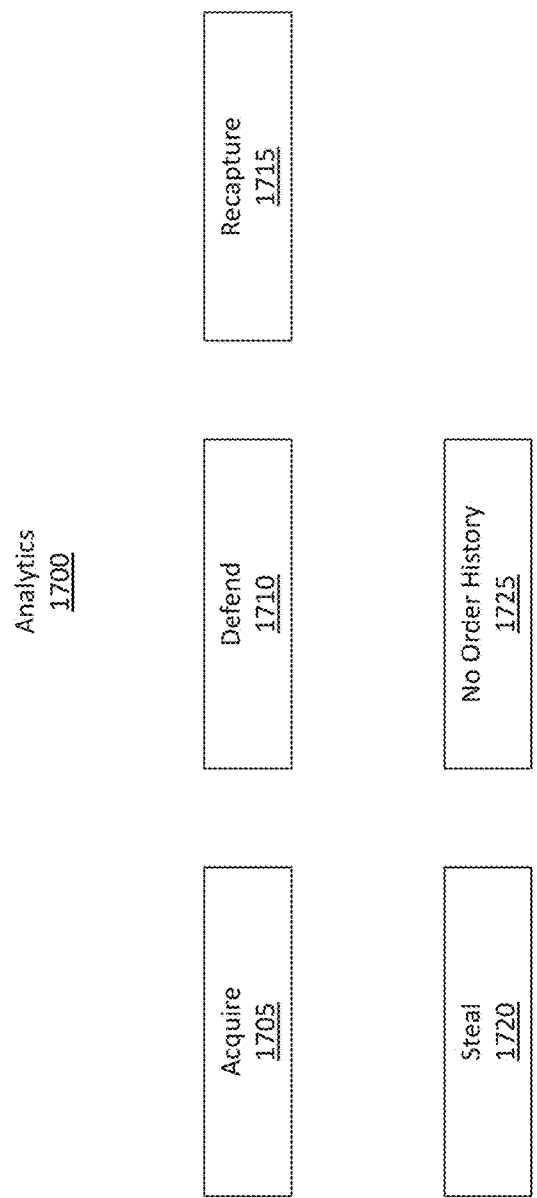
FIG. 17 illustrates various analytics associated with campaigns.

The disclosed embodiments also use the product data to create analytics that brands can rely on, where these analytics are more valuable to most brands than traditional return on ad spent (ROAS) (e.g., for every dollar a brand spends on advertising, how many dollars results in actual purchases?). In addition to ROAS, there are various other categories of analytics that the disclosed embodiments provide via the campaigns API. For instance, FIG. 17 shows a number of analytics 1700 that the campaigns API provides. These analytics 1700 include an acquire 1705 analytic, a defend 1710 analytic, a recapture 1715 analytic, and a steal 1720 analytic. These analytics reflect the loyalty type for customers. The no order history 1725 indicates that analytics cannot be compiled if a user has not profile or not order history.

Regarding the acquire 1705 analytic, this analytic refers to data about customers that have not purchased in a particular category. As a result, the customer is newly acquired for that particular category.

The defend 1710 analytic refers to data about customers that have previously purchased a product, or even any product sold by that particular brand in that particular category. Here, a brand is attempting to retain or keep that customer loyal to the brand's products.

The recapture 1715 analytic refers to data about customers that a brand has lost to that brand's competitors. Here, the brand is trying to convince a customer to return to buying that brand's products and to stop buying the competitor's products.

The steal 1720 analytic refers to data about customers that have only purchased from a brand's competitors. Here, a brand is attempting to steal a customer away from a competitor. Various different metrics or analytics can be obtained for these different analytic categories, as shown by the UI 1800 of FIG. 18.

UI 1800 shows a number of different established campaigns. UI 1800 also shows the ROAS for those campaigns. Additionally, UI 1800 shows the acquire analytics, defend analytics, steal analytics, and recapture analytics. This analytic data is obtained as a result of using the campaigns API and as a result of using the standardized data. The embodiments are able to track and monitor a user's purchases and update the analytics based on that profile data and purchase data. Using these enhanced analytics, brands can then more carefully target customers and tailor advertisements to specific types of customers. Historically, analytics have been challenging to generate because historical techniques could not adequately define what the market was. The disclosed embodiments, on the other hand, operate using comprehensively standardized data, which is used to drive the definition of a market, and which is used to generate profile information for users.

Using the standardized data, the embodiments are now able to easily generate these analytics, which is something that could not be done in the past. It should be noted, however, how the standardized data and the disclosed embodiments avoid or refrain from storing and maintaining personally identifiable information (PII). To enable profile data, a retailer is able to submit an encrypted or confidential customer identification (ID). The standardized data includes data pertaining to that customer ID (e.g., a customer order history), but the standardized data does not include PII. Thus, the user's identity is protected because only customer IDs are being used, and those IDs are not linkable (on the service side) to a specific customer. Thus, the standardized data includes a customer ID but no customer names or identifying information (other than the anonymous ID) is included in that data. The standardized data further includes a purchase order history linked to that anonymous ID. The service (e.g., service 705 from FIG. 7) receives the customer ID (e.g., ID key 720) and then accesses the standardized data, which includes information describing the purchase history. Thus, the service 705 can operate without having to know a true identity of a customer.

The disclosed embodiments beneficially operate based on attributes, not necessarily based on products IDs. The embodiments are able to provide enhanced recommendations and results to customers because the embodiments operate using attribute data instead of simply ID data. In doing so, highly customized and tailored results can be provided to customers.

The embodiments are able to use the above-described analytics to facilitate a so-called "opportunities" endeavor. Generally, the embodiments identify every single purchase that ever occurs on the website and then link that purchase back to the aisle that it came from. For instance, suppose a customer purchased ketchup. The embodiments track where that customer purchased the product and where that customer added the product to his/her digital cart (e.g., was the product found by the customer on a search result for the search ketchup or was the product found by the customer on a substitutes option). The embodiments are able to track every aisle (e.g., a display of products in the user interface or website) and what products are purchased from what aisles.

Figure 19:
FIG. 19 illustrates a so-called "opportunities" user interface, which presents certain opportunities that may be realized.

Regarding the opportunities option, the embodiments are able to identify all the other products that were included in the same aisle as the one where a product was actually purchased from. Those other products were not purchased, yet they were displayed on the same aisle as a product that was purchased. All of those other products are then provided with an "opportunity" in which advanced analytic data is provided to the brands responsible for those products. The embodiments will inform the brands which aisle and which aisle triggered a purchase (though for a different product). FIG. 19 shows an opportunities UI 1900 that lists various different opportunities for brands based on purchases of other products on an aisle.

Each product can have a so-called "opportunity." For a product, each opportunity represents a purchase that occurred where a brand's product was somewhere on the aisle but was not the purchased item. With reference to FIG. 19, the "Pepperoni Pizza" product was included in a aisle a number of times. For instance, in the "Purchases" aisle type (e.g., past purchases for a particular customer), the pepperoni pizza was displayed seven times as an option under a past purchases aisle for a group of customers, but those customers decided to buy a different brand's pepperoni pizza seven times within a defined time period. In the "Search" aisle type, the pepperoni pizza was displayed 5,009 times as an option under a search aisle for a group of customers. Thus, the embodiments are able to display real order data to brands to enable those brands to determine where those brands are losing out on potential opportunities, potential sales, or potential sale opportunities.

With the campaigns API, brands are also provided the option to target specific products or groups of products to advertise. For example, suppose a company that sells energy drinks is establishing a target group. The campaigns API allows the company to configure an option such that, when a customer enters a phrase similar to "energy drink" but does not use the company's name, then a promotion or advertisement for the company's product will be displayed. On the other hand, if the customer enters the company's name, then the customer is already highly likely to buy the company's product and there is no need for the company to advertise in that specific instance. The embodiments allow for the selective filtering of options to enable such a feature. Thus, using the filtering features, the embodiments can trigger the promotion of campaign of products based on a definable set of criteria, which is defined by the brand or company. These filtering criteria can be saved as a reusable group of targeting criteria for a campaign. This reusable group can also be used across different campaigns as well.

The campaigns API also allows brands to create a campaign that targets multiple different retailers and that bills those retailers differently. For instance, some retailers can be provided an invoice while other retailers may have a deduct-from-payment system in place (e.g., a system that deducts a value a retailer pays a brand). In this manner, different subscriptions can be established, and different billing techniques can be used.

The campaigns API can also be used to impose limits on how much a brand will pay for advertising. For instance, a brand may have a budget in place to spend on promotions and advertisements. Those budget restrictions can be defined using the campaigns API, which will then operate in accordance with those restrictions. When the level or threshold value is reached, then additional branding or advertisements can be throttled or turned off. Accordingly, the campaigns API can be used to limit or restrict how much a brand might have to pay for advertising. Different retailers or brands can have different limits, or all can have the same limit. The campaigns API provides enhanced flexibility to accommodate different limitations.

Figure 20:
FIG. 20 illustrates a bidding user interface.

The campaigns API also provides a bidding platform for brands to bid against one another to advertise their products. For example, FIG. 20 shows an example bidding UI 2000 in which brands are able to specify how much they would like to bid in an attempt to win the chance to have their advertisements displayed to customers, when those brands are competing for advertisement space with other brands. With the campaigns API, the bid is a percent of the price of the item. Traditional bidding techniques were focused on an actual dollar value that is entered.

Stated differently, each brand can submit a bid that reflects a desire from the brand to have that brand's advertisement be displayed to a customer. Other brands are also able to submit bids. These bids are based on a percentage value relative to that brand's price for a given product that is to be advertised. If a particular brand wins the bidding auction, then that brand's product will be advertised. For instance, referring to the plan 2100 configuration shown in FIG. 21, if a brand associated with Grocer A in FIG. 20 were to win the bidding auction and if that brand's product was relevant to the customer's currently active experience, then that brand's product could be displayed in the aisle slot 2105 because ads are listed as being "Ads Required."

Figure 21:
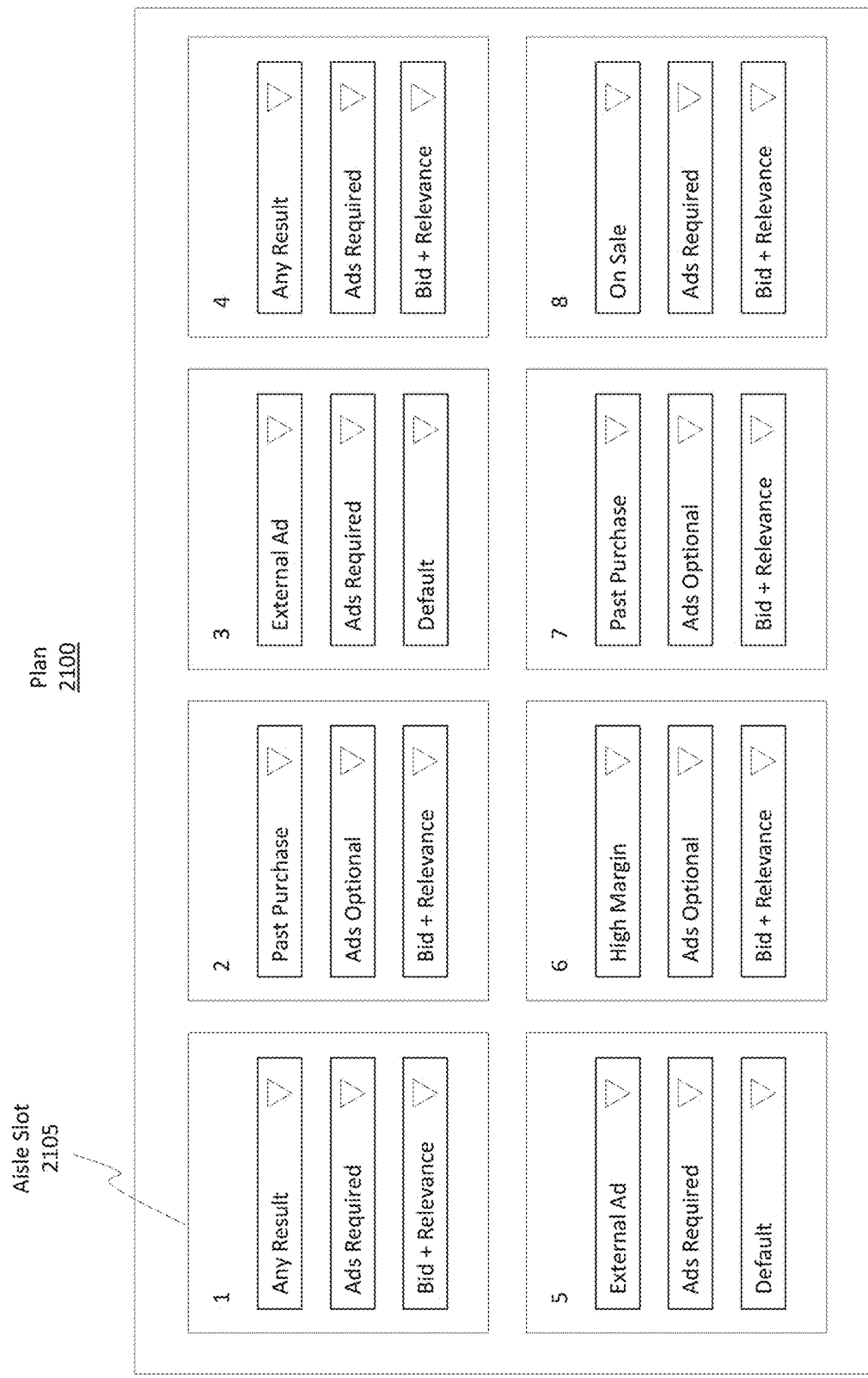
FIG. 21 illustrates a plan for configuring different aisle slots.

As far as filling in the aisle slots shown in FIG. 21, the embodiments seek out products that fit the criteria specified in each of the aisle slots. The embodiments then fill in each aisle slot one by one based on the products that are available. The brand that won the bidding auction can have a product advertised in the prime aisle slot location (e.g., the top left location in FIG. 21). The runner up in the bidding auction can then advertise in the next aisle slot whose criteria permit an advertisement. The next runner up can then advertise in the next aisle slot, and so on. The auction is a sealed, second price auction, where the winner does not necessarily pay their stated maximum; rather, the winner pays some value more (e.g., perhaps $0.01) than the second place winner. The winner will also only pay if the customer actually purchases the winner's product.

Recall, the bids were with respect to a percentage value of a price point for a product. That percentage is then converted to a dollar value. The bidder whose final dollar value is the highest will be considered as being the winner of the bidding auction. What this means is that a brand with the highest percentage value may not necessarily be the winner of the auction. The winner is the brand whose resulting dollar value is the highest. Thus, there may be a scenario where a brand with a lower percentage bid wins the auction because the price for that brand's product is higher, resulting in a higher converted dollar value than the competitors, who may have lower price points.

The campaigns API also takes into account customer specific relevance when displaying advertisements, even when a brand has submitted a bid for a product. Stated differently, the campaigns API employs a weighting mechanism to further weight advertised products based on their relevance to a customer's currently active experience. An example will be helpful.

Suppose three brands have submitted bids to advertise their diaper products. One brand is advertising an overnight size 3 diaper; a second brand is advertising an overnight size 6 diaper; and the final brand is advertising a daytime size 3 diaper. The brands submit bids. The second brand wins the auction. The first brand came in second place, and the third brand came in third place. A customer then conducts a search for the following: size 3 overnight diaper. Although all three brands are advertising diapers, the brand that is currently most relevant to a user is the first brand, followed by the third brand (because of the size), then followed by the second brand.

The campaigns API is able to assign relevance weights to the different brands' products based on the current experience the customer is having. Here, the current experience for the customer is a search experience specifically focused on a particular size and type of diaper. The campaigns API will weigh the brands' advertisements based on that relevance. As an example, the campaigns API might weigh the first brand the highest, then the third brand, then the second brand. Based on these weights, it might be the case that, even though the second brand won the auction, the weighting factors shifted which brands will have their respective products displayed in which aisle slots.

As an example, in this scenario, the weights may cause the first brand to have its product displayed in the first advertisement aisle slot. The weights may cause the second brand to have its product displayed in the next available aisle slot, and the weights may cause the third brand to have its product displayed in the following available aisle slot. Thus, the determination of when products will be displayed in which aisle slots is based on a combination of the bidding auction results as well as the weights that are determined based on relevancy to the user's currently active experience. The weighting, in some implementations, is further based on the customer's preferences. As one example, it may be the case that the customer has previously purchased size 3 diapers. Thus, size 3 diapers may be weighted higher than diapers of other sizes.

Notably, the dollar bid is multiplied by a relevance weighting factor. The resulting dollar amount is then the one that is used to determine which brand "won" the auction. Thus, in some scenarios, a brand may bid less than another brand yet still win the auction because that brand's product is determined to be more relevant to the customer's currently active experience than the product of a different brand, even one that bid a higher value.

FIG. 22 shows an example bid modifiers UI 2200 that enables brands to further customize options with respect to bidding. For instance, suppose the brand is associated with "Grocer A," as shown in FIG. 22. In this example, the brand is desirous to place its product advertisement in aisle slot 1, as shown by "Position 1" in FIG. 22. That brand may be willing to increase its max bid in order to obtain that prime advertisement position on the aisle.

As shown by FIG. 22, the campaigns API allows the brand to further customize its bid based on different factors. For instance, if the aisle slot 1 (i.e. Position 1) is available, then that brand is willing to multiply its original bid by a multiplier factor of 2. Previously, the normal bid was listed as being 15%. With this new multiplier, that brand's bid is now increased to a modified bid of 30%.

Other options are available for that brand as well. For instance, if That brand is provided any of the opportunities (e.g., acquire, defend, steal, or recapture), then that brand is also shown as being willing to increase its max bid. For instance, the bid modifiers UI 2200 includes an option to increase a max bid if the acquire opportunity is made available (and a purchase happens from that opportunity). In this example, that brand selected a ×3 modifier for the acquire opportunity. For the defend opportunity, that brand selected a ×2 modifier; for the steal opportunity, that brand selected a ×5 modifier; and for a recapture opportunity, that brand selected a ×4 modifier. These modifiers operate to further increase that brand's original max bid, thereby making the likelihood of that brand winning the auction higher for these particular scenarios. Thus, the embodiments provide the option for brands to have more granular options for specifying bids for certain pre-defined conditions and positions within the user interface.

The embodiments also allow brands to turn off campaigns a certain percentage of time. For instance, a campaign can be set to run 75% of the time, such that it is not running 25% of the time. This feature allows brands to test the effectiveness of a campaign, such as by essentially conducting an A-B test, but in the context of a campaign. Accordingly, the campaigns API allows brands to move items to different positions in an aisle via the use of aisles.

In some cases, some campaigns can be configured to enable a competitor brand to advertise its products on another competitor's aisle (e.g., a conquest campaign). Any of the experiences mentioned previously can also be used for campaign purposes. For instance, advertising campaigns can be implemented for substitute items, complement items, or even any type of searched item. Thus, the campaigns API provides a heightened level of customization for aisles.

Features API

The features API 715D from FIG. 7 provides additional techniques to enable retailers (in particular) to monetize. Generally, the features API provides a mechanism to enable a retailer (e.g., an entity running an online platform) to turn on or off any of the APIs mentioned herein based on a subscription that a brand might have with the retailer.

For instance, one brand might have a subscription that includes all of the disclosed APIs. A different brand might have a subscription (or bundle, such as a bundle of features) that includes the experiences APIs but not the campaigns API. Thus, the features API provides a heightened level of customization for retailers to enable those retailers to provide different subscriptions to brands in an attempt to further monetize their online options.

The features API can also be used to control third-party APIs. For instance, each API can optionally be associated with a brand. When a third-party API is to be used, the features API can be provided an API ID. The features API can then use that API ID to trigger the implementation of the third-party API. Thus, a call can be made to the features API to call yet a different API for an online platform. In some implementations, specific features can be turned on or turned off by the retailer. For instance, the retailer may provide the option to display advanced product content descriptions on the product detail page. The embodiments can provide the option to enable or disable this feature.

Accordingly, the disclosed embodiments provide a predefined list of features that can be viewed as being call statements to actual APIs. The features API allows entities to specify, in the form of a subscription, which features are to be enabled or disabled for that entity. Different features will be provided for different subscription levels. That is, depending on what subscription level a brand buys, then that brand will receive a different listing of features. Thus, the embodiments enable features/APIs to be toggled on or off. The embodiments further allow retailers to establish subscriptions that include preselected or customized features that can be provided to brands.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 23:
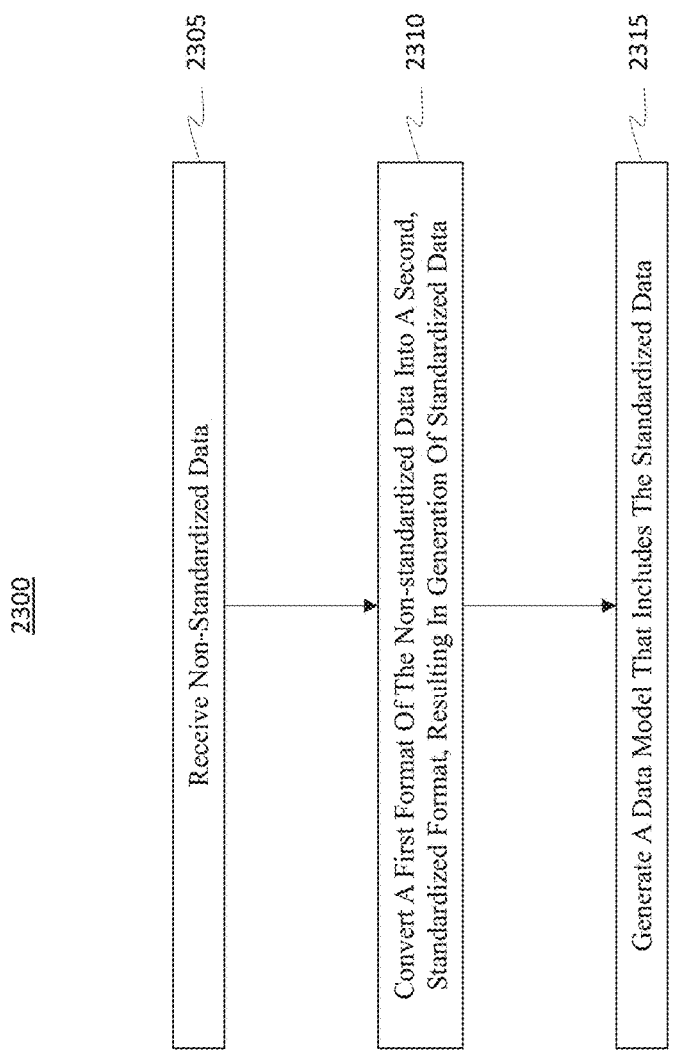
FIG. 23 illustrates a flowchart of an example method for generating standardized data.

Attention will now be directed to FIG. 23, which illustrates a flowchart of an example method 2300 for standardizing a catalog of data and for using the standardized data to implement various application programming interfaces (APIs). Method 2300 can be implemented by a service, such as the service 105 of FIG. 1. The service may include one or more of a machine learning (ML) algorithm or a generative pre-trained transformer (GPT).

Method 2300 includes an act (act 2305) of receiving non-standardized data (e.g., non-standardized data 120) comprising data that includes information describing a plurality of items (e.g., catalog data 120A). This information is obtained from a first domain. As an example, the first domain can be the domain of an online retailer, grocer, or other online business entity. In this sense, the plurality of items can optionally be items included in an online catalog or perhaps an in-store catalog.

The information further includes customer information (e.g., customer data 120C) that is also obtained from the first domain. The information further includes unstructured review data (e.g., 125B) obtained from a second domain that is different from the first domain. Examples of the second domain can be a different online purchasing platform, a social media, a forum, or any other type of online platform. Accordingly, in some implementations, the first domain is a domain of an online business entity, and the second domain is a domain of a social media entity.

Act 2310 includes converting a first format of the non-standardized data into a second, standardized format, resulting in generation of standardized data. For example, the first format can be the format of a catalog provided by an online grocer, retailer, or entity. It is often the case that the data included in this catalog has many differences in how the data is presented, including spelling differences, naming conventions, and organization. It is also often the case that this data is structured to include only a limited number of features or characteristics.

The standardized data includes a hierarchy comprising a plurality of defined categories into which various portions of the standardized data are categorized. As one example, FIG. 3 shows a category 300 labeled as "Frozen Pizza." This category is an umbrella term that commonly describes multiple different products included in a grocer's online catalog. Products or items are grouped together using intelligence, such as machine learning, based on a determination that those items share various commonalities with one another. Category 300 is one category included in many categories that are generated by the disclosed service.

Each defined category in the plurality of defined categories is associated with a corresponding set of attribute types that describe various attributes for each defined category, thereby resulting in a hierarchy of information. In some cases, the hierarchy can be structured or otherwise organized in a tree structure, such as an abstract syntax tree (AST). To illustrate, the attribute types 305 of FIG. 3 are associated with the category 300.

In some scenarios, the plurality of defined categories includes a first category that commonly describes multiple different items included in the plurality of items. Optionally, a number of attribute types that are associated with the first category exceeds 20 attribute types. Optionally, the number of attribute types that are associated with the first category exceeds 30 attribute types. Each item in the multiple different items is assigned a corresponding qualifier or value for each of the number of attribute types (e.g., 10, 20, 30, more than 30).

The standardized data also includes anonymized profiles comprising a customer identification (ID) linked to the customer information. For instance, it is often the case that the online platform or entity includes a customer's purchase history, browsing history, and other information related to the customer's interaction with the online entity. Any personally identifiable information (PII) can be stripped from that data and the resulting data can be provided to the service. An anonymous customer ID may then be associated with the listing of information. Because the customer ID is anonymous, the identity of the customer is kept private. Now, the customer ID is simply linked to a number of items to form a relationship between the customer ID and the item listing. If the customer ID were to be intercepted or otherwise obtained, all that would be revealed is a listing of items without any kind of understanding as to which customer is associated with those items.

The unstructured review data is also provided structure. For instance, the unstructured review data may include sentimental feedback data describing an item. Often, the sentimental feedback data is not associated with a quantity value or other structure. The disclosed embodiments are able to implement machine learning, particularly natural language processing, to provide structure to the unstructured data.

For instance, consider the following feedback: "this product is just the best thing ever." The NLP engine is able to analyze this statement and determine that it is generally positive in tone and sentiment. The NLP engine can then assign a sentiment rating or other qualitative metric (e.g., a 5 star rating) to the statement, thereby providing structure to the statement. Accordingly, in some implementations, the unstructured review data includes sentiment data expressing a sentiment of a user who submitted the unstructured review data. A natural language processing (NLP) engine can be used to provide the structure to the unstructured review data by determining the sentiment of the user and by assigning a quantitative value to the sentiment.

Act 2315 then includes generating a data model. This data model includes the standardized data. The standardized data is made accessible to one or more application programming interfaces (APIs) via an ID key. For example, any one or more of the experiences API 715A, aisles API 715B, campaigns API 715C, or features API 715D can access the standardized data to achieve the various different operations mentioned earlier.

Methods for Implementing Experiences APIs

Figure 24A:
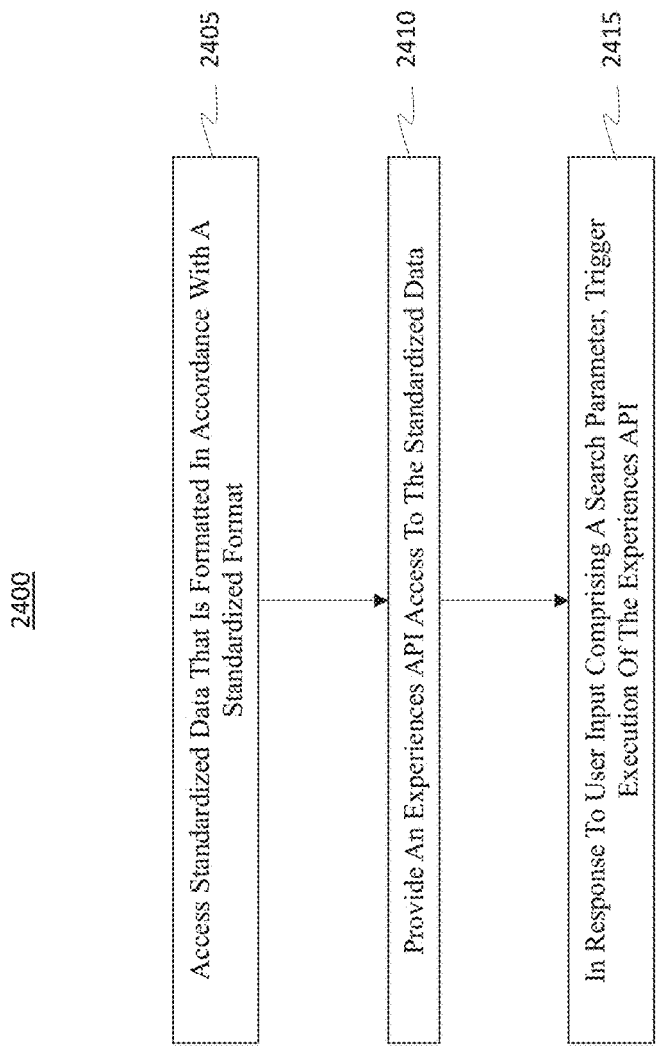
FIGS. 24A and 24B illustrate flowcharts of an example method for using the standardized data.
Figure 24B:
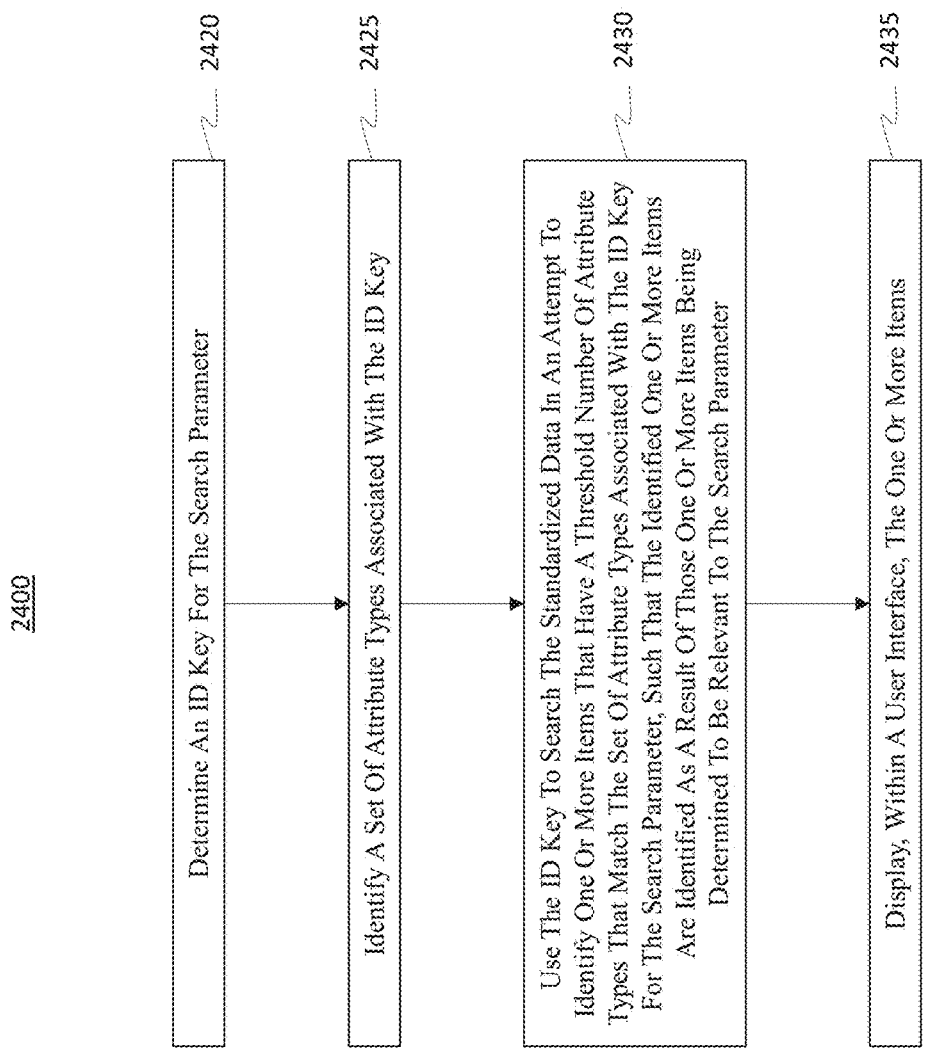

Attention will now be directed to FIGS. 24A and 24B, which illustrate flowcharts of an example method for accessing standardized data and for enabling one or more application programming interfaces (APIs) to perform operations using the standardized data. Method 2400 can be implemented by the service 705 of FIG. 7. That service can optionally be a cloud service.

Act 2405 includes accessing standardized data (e.g., standardized data 135 of FIG. 1 or standardized data 710 of FIG. 7). This standardized data is formatted in accordance with a standardized format. Notably, the standardized data includes a hierarchy comprising a plurality of defined categories into which various portions of the standardized data are categorized. Each defined category in the plurality of defined categories is associated with a corresponding set of attribute types that describe various attributes for said each defined category. A number of attribute types for each defined category in the plurality of defined categories exceeds 15 attribute types. Thus, each item or product is associated with a large number of attribute types.

In some implementations, the standardized data includes a category ID linked to a group of items that share one or more common characteristics. The standardized data can include products IDs, profile or customer IDs, or any other type of ID linked to one or more items or products.

The standardized data includes anonymized profiles comprising a customer identification (ID) linked to customer information. Also, unstructured review data is provided structure and is included in the standardized data.

Act 2410 includes providing an experiences API access to the standardized data. The access is provided by way of one or more identification (ID) keys that facilitate the access to the standardized data. For example, any of the experiences API 800 of FIG. 8 can be used.

In response to user input comprising a search parameter, act 2415 includes triggering execution of the experiences API, and in particular the search API 805. Execution of this experiences API is described with respect to FIG. 24B.

In FIG. 24B, act 2420 includes determining an ID key for the search parameter. Optionally, the search parameter can be one of a name of an item or a name of a class of items. The ID key can be one of an ID key for a single item or an ID key for a particular category of multiple items or even a list of multiple items, such as a new recommendations API.

Act 2425 includes identifying a set of attribute types associated with the ID key. Act 2430 includes using the ID key to search the standardized data in an attempt to identify one or more items that have a threshold number of attribute types that match the set of attribute types associated with the ID key for the search parameter. As a result, the identified one or more items are identified as a result of those one or more items being determined to be relevant to the search parameter. Determining that those one or more items are relevant to the search parameter may, in some instances, be based on a combination of a weighting factor for relevancy and a determination that the threshold number of attribute types is satisfied.

Act 2435 then includes displaying, within a user interface, the one or more items. The user can then use the user interface to interact with the items, such as perhaps by purchasing one or more of those items. Optionally, the one or more items can be sorted in the user interface based on a sorting criteria.

In addition or as an alternative to providing the experiences API access to the standardized data, the embodiments can also provide that access to any of the other APIs mentioned herein. Those APIs include any of the sub-APIs in the experiences API as well as the aisles API, the campaigns API, and the features API.

When the aisles API is triggered, the disclosed service is able to receive any type of user input comprising an aisles parameter. Such parameters can include information related to specifying any type of aisle plan group, aisle plan, or any of the parameters mentioned with regard to the aisle slots. The parameters can then be used to perform any of the aisle operations mentioned earlier. Similarly, when the campaigns or features APIs are triggered, the disclosed service is able to receive any type of user input comprising campaigns parameters or features parameters. Such parameters can include any of the information mentioned earlier. These parameters can then be used to perform any of the campaigns operations or features operations mentioned earlier.

Accordingly, the disclosed embodiments are able to generate standardized data. This data can then be made available to a plethora of different APIs. The results produced by these APIs is of a higher quality as a result of the use of the standardized data.

Example Computer/Computer Systems

Figure 25:
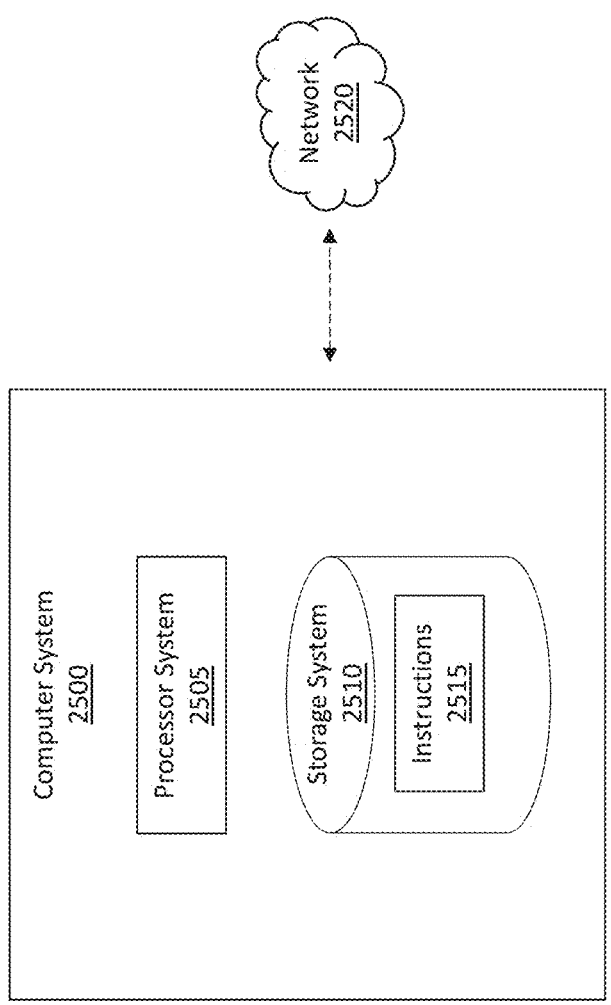
FIG. 25 illustrates an example of a computer system capable of performing any of the disclosed operations.

Attention will now be directed to FIG. 25 which illustrates an example computer system 2500 that may include and/or be used to perform any of the operations described herein. For instance, computer system 2500 can reflect any of the servers, systems, or infrastructures described herein. Computer system 2500 may take various different forms. For example, computer system 2500 may be embodied as a tablet, a desktop, a laptop, a mobile device, or a standalone device, such as those described throughout this disclosure. Computer system 2500 may also be a distributed system that includes one or more connected computing components/devices that are in communication with computer system 2500.

In its most basic configuration, computer system 2500 includes various different components. FIG. 25 shows that computer system 2500 includes a processor system 2505 comprising any number of processors (aka a "hardware processing unit") and storage system 2510 comprising any number of hardware storage devices.

Regarding the processor(s), it will be appreciated that the functionality described herein can be performed, at least in part, by one or more hardware logic components. For example, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," "service," or "engine" can refer to hardware processing units or to software objects, routines, or methods that may be executed on computer system 2500. The different components, modules, engines, and services described herein may be implemented as objects or processors that execute on computer system 2500 (e.g. as separate threads).

Storage system 2510 may include physical system memory, which may be volatile, non-volatile, or some combination of the two. The term "memory" may also be used herein to refer to non-volatile mass storage such as physical storage media. If computer system 2500 is distributed, the processing, memory, and/or storage capability may be distributed as well.

Storage system 2510 is shown as including executable instructions 2515. The executable instructions 2515 represent instructions that are executable by the processor(s) of the processor system 2505 to perform the disclosed operations, such as those described in the various methods.

The disclosed embodiments may comprise or utilize a special-purpose or general-purpose computer including computer hardware, such as, for example, one or more processors (e.g., included in the processor system 2505) and system memory (e.g., included in the storage system 2510), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example, the current embodiments can comprise at least two distinctly different kinds of computer-readable media: computer storage media and transmission media.

Computer storage media (aka "hardware storage device") are computer-readable hardware storage devices, such as random access memory ("RAM"), read-only memory ("ROM"), electrically erasable programmable read-only memory ("EEPROM"), compact disk read-only memory ("CD-ROM"), solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 2500 may also be connected (via a wired or wireless connection) to external sensors (e.g., one or more remote cameras) or devices via a network 2520. For example, computer system 2500 can communicate with any number devices or cloud services to obtain or process data. In some cases, network 2520 may itself be a cloud network. Furthermore, computer system 2500 may also be connected through one or more wired or wireless networks to remote/separate computer systems(s) that are configured to perform any of the processing described with regard to computer system 2500.

A "network," like network 2520, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 2500 will include one or more communication channels that are used to communicate with the network 2520. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card (NIC)) and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set; "superset" is defined as a non-empty superset; and "subset" is defined as a non-empty subset. Unless otherwise specified, the term "subset" excludes the entirety of its superset (i.e. the superset contains at least one item not included in the subset). Unless otherwise specified, a "superset" can include at least one additional element, and a "subset" can exclude at least one element.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
receiving non-standardized data comprising: (i) information describing a plurality of items, said information being obtained from a first domain, and (ii) customer information that is also obtained from the first domain;
generating standardized data by converting a format of the non-standardized data into a standardized format, wherein:
the standardized data includes a hierarchy of multiple defined categories into which various portions of the standardized data are categorized, and
each of the multiple defined categories is associated with a corresponding set of attribute types that describe attributes for said each of the multiple defined categories;
including the standardized data within a data model, wherein the standardized data is made accessible to one or more application programming interfaces (APIs), including a substitutions API;
receiving a user query targeting an item included in one of the multiple defined categories;
causing the substitutions API to use the standardized data to identify a substitution for the item, wherein identifying the substitution includes:
determining an item preference for a user who submitted the user query or, alternatively, determining a historical purchase trend for the user;
searching the standardized data, resulting in identification of a plurality of alternative items that are determined to share a threshold level of similarity to the item;
excluding at least one item from the plurality of alternative items, the at least one excluded item being one that is determined to not satisfy the item preference for the user or the historical purchase trend for the user, said excluding resulting in generation of a subset of alternative items; and selecting the substitution from among the subset of alternative items; and displaying the substitution on a user interface; and causing the substitution to be selectable within the user interface.

2. The method of claim 1, wherein the method is performed, at least in part, using a generative pre-trained transformer (GPT) model.

3. The method of claim 1, wherein generating the standardized data is performed using a generative pre-trained transformer (GPT) model.

4. The method of claim 1, wherein the method is performed by a service that includes at least one of a machine learning (ML) algorithm or a generative pre-trained transformer (GPT).

5. The method of claim 1, wherein identifying the substitution includes determining the item preference for the user who submitted the user query.

6. The method of claim 1, wherein identifying the substitution includes determining the historical purchase trend for the user.

7. The method of claim 1, wherein identifying the substitution includes determining both the item preference for the user who submitted the user query and the historical purchase trend for the user.

8. The method of claim 1, wherein the multiple defined categories include a first category that commonly describes multiple different items included in the plurality of items, and wherein a number of attribute types that are associated with the first category exceeds 20 attribute types.

9. The method of claim 1, wherein the non-standardized data includes catalog data.

10. The method of claim 1, wherein the non-standardized data further includes label data for an item included among the plurality of items, and wherein the label data is obtained from a second domain.

11. A computer system comprising:

a processor system; and a storage system that stores instructions that are executable by the processor system to cause the computer system to:

receive non-standardized data comprising: (i) information describing a plurality of items, said information being obtained from a first domain, and (ii) customer information that is also obtained from the first domain;

generate standardized data by converting a format of the non-standardized data into a standardized format, wherein:

the standardized data includes a hierarchy of multiple defined categories into which various portions of the standardized data are categorized, and each of the multiple defined categories is associated with a corresponding set of attribute types that describe attributes for said each of the multiple defined categories;

include the standardized data within a data model, wherein the standardized data is made accessible to one or more application programming interfaces (APIs), including a substitutions API;

receive a user query targeting an item included in one of the multiple defined categories;

cause the substitutions API to use the standardized data to identify a substitution for the item, wherein identifying the substitution includes:

determining an item preference for a user who submitted the user query or, alternatively, determining a historical purchase trend for the user;

searching the standardized data, resulting in identification of a plurality of alternative items that are determined to share a threshold level of similarity to the item;

excluding at least one item from the plurality of alternative items, the at least one excluded item being one that is determined to not satisfy the item preference for the user or the historical purchase trend for the user, said excluding resulting in generation of a subset of alternative items; and selecting the substitution from among the subset of alternative items; and display the substitution on a user interface; and cause the substitution to be selectable within the user interface.

12. The computer system of claim 11, wherein the threshold level of similarity is based on a common brand.

13. The computer system of claim 11, wherein the substitutions API is integrated with a search API.

14. The computer system of claim 13, wherein the search API is called before the substitutions API, wherein the search API returns less than a threshold number of items, and wherein, as a result of the search API returning less than the threshold number of items, the substitutions API is called.

15. The computer system of claim 14, wherein the substitutions API returns a number of items that at least meets the threshold number of items.

16. The computer system of claim 11, wherein determining the item preference for the user who submitted the user query includes identifying an express restriction previously used by the user.

17. A storage system that stores instructions that are executable by a processor system to cause the processor system to:

receive non-standardized data comprising: (i) information describing a plurality of items, said information being obtained from a first domain, and (ii) customer information that is also obtained from the first domain;

generate standardized data by converting a format of the non-standardized data into a standardized format, wherein:

the standardized data includes a hierarchy of multiple defined categories into which various portions of the standardized data are categorized, and each of the multiple defined categories is associated with a corresponding set of attribute types that describe attributes for said each of the multiple defined categories;

include the standardized data within a data model, wherein the standardized data is made accessible to one or more application programming interfaces (APIs), including a substitutions API;

receive a user query targeting an item included in one of the multiple defined categories;

cause the substitutions API to use the standardized data to identify a substitution for the item, wherein identifying the substitution includes:

determining an item preference for a user who submitted the user query or, alternatively, determining a historical purchase trend for the user;

searching the standardized data, resulting in identification of a plurality of alternative items that are determined to share a threshold level of similarity to the item;

excluding at least one item from the plurality of alternative items, the at least one excluded item being one that is determined to not satisfy the item preference for the user or the historical purchase trend for the user, said excluding resulting in generation of a subset of alternative items; and selecting the substitution from among the subset of alternative items; and display the substitution on a user interface; and cause the substitution to be selectable within the user interface.

18. The storage system of claim 17, wherein the substitutions API is triggered in response to a determination that the item included in the user query is not available.

19. The storage system of claim 17, wherein a second substitution is identified, and wherein the user interface simultaneously displays the substitution and the second substitution.

20. The storage system of claim 17, wherein the substitution is a flavor- based substitution.

\* \* \* \* \*